(12) United States Patent  
Kim et al.

(10) Patent No.: US 9,547,092 B2
(45) Date of Patent: Jan. 17, 2017

(54) APPARATUS AND METHOD OF DETECTING X-RAY, AND X-RAY IMAGING SYSTEM

(71) Applicant: Samsung Electronics Co., Ltd., Suwon-si, Gyeonggi-do (KR)

(72) Inventors: Young Kim, Yongin-si (KR); Jaechul Park, Yangju-si (KR); Kangho Lee, Osan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/744,277

(22) Filed: Jun. 19, 2015

(65) Prior Publication Data
US 2016/0116611 A1 Apr. 28, 2016

(30) Foreign Application Priority Data

Oct. 24, 2014 (KR) .......................... 10-2014-0145393

(51) Int. Cl.
*G01T 1/24* (2006.01)
*H04N 5/32* (2006.01)
*H04N 5/335* (2011.01)

(52) U.S. Cl.
CPC ............... *G01T 1/247* (2013.01); *G01T 1/244* (2013.01); *H04N 5/32* (2013.01); *H04N 5/335* (2013.01)

(58) Field of Classification Search
CPC ................................. G01T 1/244; G01T 1/247
See application file for complete search history.

(56) References Cited

U.S. PATENT DOCUMENTS

| | | | |
|---|---|---|---|
| 6,078,053 A | 6/2000 | Adam et al. | |
| 7,110,498 B2 | 9/2006 | Yamada | |
| 7,791,080 B2 | 9/2010 | Hsiao et al. | |
| 7,816,680 B2 | 10/2010 | Kim et al. | |
| 8,217,357 B2 | 7/2012 | Stein et al. | |
| 8,242,495 B2 | 8/2012 | Shu et al. | |
| 8,735,839 B2 | 5/2014 | Kim et al. | |
| 8,963,096 B2 | 2/2015 | Kim et al. | |
| 2007/0045552 A1 | 3/2007 | Masazumi | |
| 2011/0147596 A1* | 6/2011 | Ishida | H01L 27/14659 250/366 |
| 2012/0119099 A1 | 5/2012 | Zeller | |
| 2013/0170620 A1 | 7/2013 | Tredwell et al. | |
| 2014/0117202 A1 | 5/2014 | Yoon et al. | |

FOREIGN PATENT DOCUMENTS

| | | |
|---|---|---|
| KR | 20050027051 A | 3/2005 |
| KR | 20110080052 A | 7/2011 |
| KR | 20140000477 A | 1/2014 |
| WO | WO 2009/031693 A1 | 3/2009 |

OTHER PUBLICATIONS

European Search Report dated Feb. 12, 2016 in connection with European Patent Application No. 15181601.4, 7 pages.

* cited by examiner

*Primary Examiner* — Mark R Gaworecki

(57) ABSTRACT

A method and apparatus for detecting an X-ray, the apparatus includes a detector which comprises a pixel array in which a plurality of pixels for detecting an X-ray transmitted by a body to be examined are arranged in a matrix form, a read-out unit which reads out electrical signals corresponding to the detected X-ray from the pixel array, and a reset controller which controls the pixel array to be reset after the X ray is detected, by performing switching so that the plurality of pixels of the pixel array are commonly connected to the reset power source.

24 Claims, 21 Drawing Sheets

RESET MODE

READ-OUT MODE

APPARATUS AND METHOD OF DETECTING X-RAY, AND X-RAY IMAGING SYSTEM

RELATED APPLICATIONS

This application claims the benefit of Korean Patent Application No. 10-2014-0145393, filed on Oct. 24, 2014, in the Korean Intellectual Property Office, the disclosure of which is incorporated herein in its entirety by reference.

BACKGROUND

1. Field

The present disclosure relates to an apparatus and method of detecting X-rays, and an X-ray imaging system.

2. Description of the Related Art

X-ray imaging systems project X-rays toward an object such as a human body and detect X-rays that have passed through the object, thereby acquiring an image of the internal structure of the object. X-ray technology is currently used for practical applications in the medical field, the industrial field, the science field, and the like. In particular, in the medical field, X-ray technology is used as a tool for diagnosing the health of a patient. Since an X-ray image of an anatomical structure of a human body is acquired by using X-ray technology, X-ray technology may contribute to ascertaining a pathological phenomenon, a disease, or an abnormal anatomical internal structure of a human body.

SUMMARY

Provided are methods and apparatuses for an X-ray detecting apparatus and an X-ray detecting method capable of preventing an offset phenomenon in which a difference is generated between the reset voltages of pixels of a pixel array that are connected to different lines after the pixel array is reset, and an X-ray imaging system.

Additional features will be set forth in part in the description which follows and, in part, will be apparent from the description, or may be learned by practice of some example embodiments.

According to some example embodiments, an apparatus for detecting an X-ray may include a detector which may include a pixel array including a plurality of pixels arranged in a matrix form, the detector may be configured to detect an X-ray radiation transmitted by a body to be examined. The apparatus may also include a read-out unit configured to read out electrical signals corresponding to the detected X-ray from the pixel array, and may also include a reset controller configured to control the pixel array, the controlling including performing switching so that the plurality of pixels of the pixel array are commonly connected to a reset power source thereby resetting the pixel array after the X ray is detected.

According to another example embodiment, the reset controller may be configured to perform the switching so that the plurality of pixels of the pixel array are commonly connected to the reset power source, by setting at least one switch connected between the detector and the read-out unit.

According to another example embodiment, the reset controller may include the at least one switch connected to each of m column lines (where m is a natural number) of the pixel array, and the at least one switch may be commonly connected to the reset power source.

According to another example embodiment, the read-out unit may include a first read-out unit connected to a first end of the detector and a second read-out unit connected to a second end of the detector, and the reset controller may include m pairs of switches, each pair of switches connected to ends of each m column lines.

According to another example embodiment, the read-out unit may be connected to one end of the detector, and the reset controller may include m switches each of which is connected to one end of each of the m column lines.

According to another example embodiment, each of the plurality of pixels may include a storage capacitor configured to store a charge amount which varies according to the intensity of the detected X ray, and the reset power source may be configured to reset the charge amount of the storage capacitor using power supplied from the reset power source commonly connected to the plurality of pixels.

According to another example embodiment, the read-out unit may be configured to read out the electrical signals in units of row lines of the pixel array, the apparatus may include a line selector configured to select the row lines of the pixel array according to a row address signal configured to drive the pixel array in units of row lines, and the line selector may be configured to select all of the row lines of the pixel array when in a reset mode for resetting the pixel array.

According to another example embodiment, the reset controller may be configured to control the switching so that the plurality of pixels of the pixel array are commonly connected to the reset power source, when in a reset mode for resetting the pixel array.

According to another example embodiment, the reset controller may be configured to control the switching so that the plurality of pixels of the pixel array are connected to the read-out unit, when in a read-out mode for reading out the electrical signals.

According to another example embodiment, the reset power source may be configured to select at least one from a Low Drop Out (LDO) regulator, a direct current (DC)-to-DC converter, and an alternating current (AC)-to-DC converter that are included outside the detector, the read-out unit, and the reset controller.

Accordingly to another example embodiment, the reset controller may be configured to perform switching so that the plurality of pixels of the pixel array are commonly connected to the reset power source, by using at least one switch connected to the pixel array.

According to some example embodiments, a method of resetting an X-ray detecting apparatus may include detecting X-ray radiation transmitted by a body to be examined, by using a pixel array in which a plurality of pixels are arranged in a matrix form, reading out electrical signals corresponding to the detected X-ray radiation from the pixel array, and controlling the pixel array, the controlling including performing switching so that the plurality of pixels of the pixel array are commonly connected to a reset power source so that the pixel array is reset, thereby resetting the pixel array.

According to an example embodiment, the controlling may include performing the switching so that the plurality of pixels of the pixel array are commonly connected to the reset power source, by using at least one switch connected between a detector and a read-out unit.

According to another example embodiment, the controlling may include controlling the pixel array to be reset, by performing switching so that the at least one switch connected to each of m column lines of the pixel array is connected to the reset power source, wherein m is a natural number.

According to another example embodiment, the reading out may include reading out the electrical signals in units of row lines of the pixel array, and the method may include selecting the row lines of the pixel array according to a row address signal for driving the pixel array in units of row lines, and the selecting may include selecting all of the row lines of the pixel array in a reset mode for resetting the pixel array.

According to another example embodiment, the controlling may include controlling the switching so that the plurality of pixels of the pixel array are commonly connected to the reset power source, in a reset mode for resetting the pixel array.

According to another example embodiment, the controlling may include controlling the switching so that the plurality of pixels of the pixel array are connected to the read-out unit, in a read-out mode for reading out the electrical signals.

According to another example embodiment, the controlling may include controlling the pixel array to be reset, by performing switching so that reset power of the reset power source is supplied by using at least one switch that is in a detector and connected to the pixel array.

According to another example embodiment, the resetting of the pixel array may be completed within 49 msec.

According to another example embodiment, the resetting of the pixel array may be completed within 20 msec.

According to some example embodiments, a detecting apparatus may include a pixel array including a plurality of pixels, the pixel array configured to detect radiation that has been transmitted by a body to be examined, a read-out unit configured to read out electrical signals corresponding to the detected radiation from the pixel array, a plurality of data lines connected to the plurality of pixels, and a plurality of switches connected to the plurality of data lines and connected to the read-out unit in a read-out mode, and the plurality of switches connected to the plurality of data lines and to a reset power source in a reset mode, and a reset controller configured to reset the pixel array, the controlling including setting the plurality of switches so that the plurality of pixels of the pixel array are commonly connected to the reset power source when in the reset mode.

According to another example embodiment, the plurality of switches may be connected between the pixel array and the read-out unit.

According to another example embodiment, each of the plurality of pixels may include a storage capacitor configured to store a charge amount which varies according to the intensity of the detected radiation, and the storage capacitor configured to reset the charge amount when supplied by power from the reset power source, the reset power source commonly connected to the plurality of pixels.

According to another example embodiment, the read-out unit may be configured to read out the electrical signals in units of row lines of the pixel array, the detecting apparatus may include a line selector which selects the row lines of the pixel array according to a row address signal for driving the pixel array in units of row lines, and in the reset mode, the line selector may select all of the row lines of the pixel array.

According to another example embodiment, the reset power source may be configured to select at least one from an LDO regulator, a DC-to-DC converter, and an AC-to-DC converter, that are included outside the pixel array and the read-out unit.

According to some example embodiments, a radiation detecting system may comprise a radiation radiating apparatus configured to transmit radiation at an object, the radiation radiating apparatus may include at least one radiation source configured to provide radiation, a radiation detecting apparatus configured to detect radiation transmitted by the radiation radiating apparatus after radiating the object, the radiation detecting apparatus may include a radiation detector, a reset controller, and a read-out unit, a control device may be configured to transmit a first control command to the radiation radiating apparatus and a second control command to the radiation detecting apparatus, the first control command may include instructions to set a focusing location or a radiation dose to the radiation radiating apparatus, and the second control command may include instructions to reset the radiation detecting apparatus, and a power source. According to an example embodiment, the radiation detector may include a pixel array including a plurality of pixels, the pixel array configured to detect the radiation transmitted by the object after being radiated by the radiation source.

According to another example embodiment, the read-out unit may include a read-out integrated circuit (ROIC) configured to read out signals corresponding to the detected radiation from the pixel array, the ROIC including at least one read-out device connected to the pixel array.

According to another example embodiment, the reset controller may include a reset switch unit configured to control a reset operation of at least one of the plurality of pixels of the pixel array, the reset switch unit configured to connect to the ROIC, the pixel array and the power source.

BRIEF DESCRIPTION OF THE DRAWINGS

The foregoing and other features of some example embodiments will be apparent from the more particular description of non-limiting embodiments of some example embodiments, as illustrated in the accompanying drawings in which like reference characters refer to like parts throughout the different views. The drawings are not necessarily to scale, emphasis instead being placed upon illustrating principles of some example embodiments. In the drawings.

DETAILED DESCRIPTION

Figure 1:
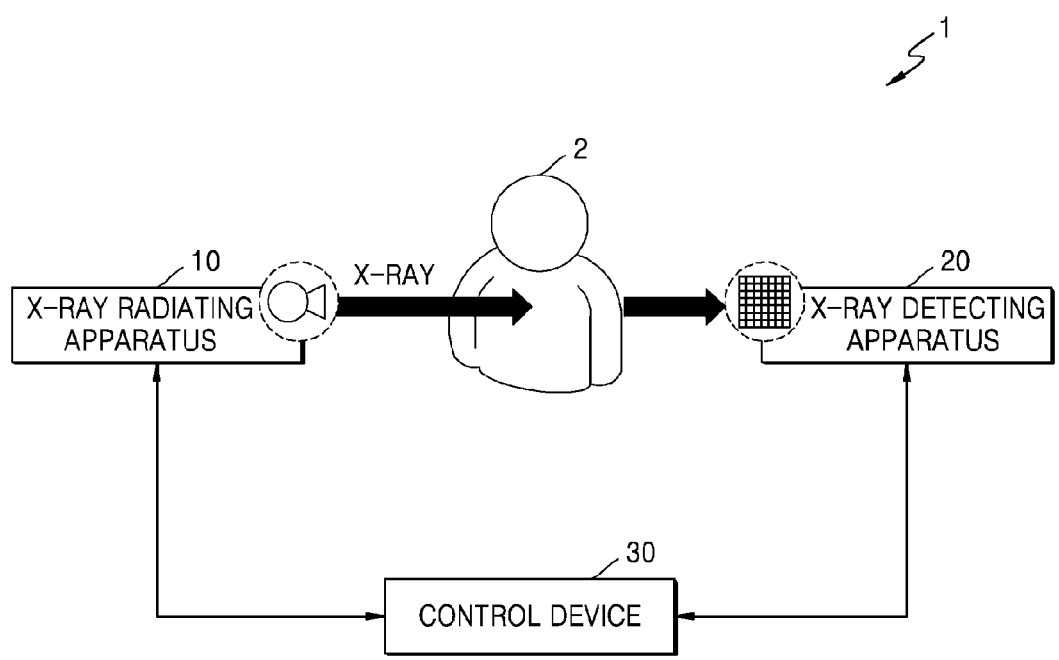
FIG. 1 is a schematic diagram of an X-ray imaging system according to an example embodiment.

Example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments to those of ordinary skill in the art. In the drawings, the thicknesses of layers and regions are exaggerated for clarity. Like reference characters and/or numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). As used herein the term "and/or" includes any and all combinations of one or more of the associated listed items.

It will be understood that, although the terms "first", "second", etc. may be used herein to describe various elements, components, regions, layers and/or sections. These elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof. Expressions such as "at least one of," when preceding a list of elements, modify the entire list of elements and do not modify the individual elements of the list.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 is a schematic diagram of an X-ray imaging system 1 according to an example embodiment.

Referring to FIG. 1, the X-ray imaging system 1 may include an X-ray radiating apparatus 10, an X-ray detecting apparatus 20, and a control device 30. Only components related with some example embodiments from among the components of the X-ray imaging system 1 are shown in FIG. 1. It will be understood by one of ordinary skill in the art that additional components other than the components illustrated in FIG. 1 may be further included, such as general-use components.

The X-ray imaging system 1 captures an X-ray image of a part of a patient 2 that is to be examined. The part of the patient 2 that is to be examined may be, for example, a breast of the patient 2. In this case, the X-ray imaging system 1 may correspond to a mammography system. However, the X-ray imaging system 1 may capture an X-ray medical image of a part other than the breast of the patient 2. Moreover, the X-ray imaging system 1 may not only be used for a medical purpose associated a patient, but may also be used for an industrial, military, security and/or scientific purpose, such as to ascertaining the internal structure of a matter. In other words, a body of the X-ray imaging system 1 that is to be examined may be not only the patient 2, but also physical objects, matter or the like.

X-rays are short-wavelength electronic waves that are generated when an electron ray, quickly projected by a cathode, collides with a heavy metal during vacuum discharge. The X-rays have greatly high transmittance with respect to an object and produce fluorescence. Accordingly, when an X-ray is radiated to a part of the patient 2 that is to be examined, a portion of the X-ray is absorbed by the part to be examined and thus attenuated, and thus the density, thickness, or the like of the inside of the part to be examined may be changed. The X-ray imaging system 1 acquires an X-ray image that represents a shape and a structure of the inside of the part of the patient 2 that is to be examined by using the above-described properties of an X-ray.

The X-ray radiating apparatus 10 may be hardware that may generate an X-ray and may project the generated X-ray to the part of the patient 2 that is to be examined. It is generally known that the degree to which an X-ray is transmitted by the part of the patient 2 that is to be examined may vary depending on a dose of the X-ray that represents the intensity of the X-ray. The conditions of the dose of an X-ray that is to be projected may be controlled by the control device 30.

The X-ray detecting apparatus 20 may be hardware that may detect an X-ray that has been transmitted by the part of the patient 2 that is to be examined. The X-ray detecting apparatus 20 may convert the detected X-ray into a digital signal by including a flat panel detector (FPD). The X-ray detecting apparatus 20 may be referred to an X-ray detector.

In more detail, the X-ray detecting apparatus 20 may convert the detected X-ray into a digital signal by reading out electrical signals corresponding to the detected X-ray by using an FPD having a pixel array for detecting an X-ray transmitted by a body to be examined (i.e., the patient 2). At this time, the X-ray detecting apparatus 20 may reset the pixel array after the X-ray is detected, by performing switching so that a reset power source that may be commonly connected to a plurality of pixels of the pixel array supplies reset power.

The control device 30 may be hardware that may control overall operations of devices included in the X-ray imaging system 1, for example, the X-ray radiating apparatus 10 and the X-ray detecting apparatus 20, and may be implemented by using a computing device including a processor. Accordingly, the control device 30 may control a focusing location, a dose, and the like of an X-ray that is to be radiated by the X-ray radiating apparatus 10, and may also control X-ray detection of the X-ray detecting apparatus 20, resetting of the X-ray detecting apparatus 20, and the like. The control device 30 may generate an X-ray image of the part of the patient 2 that is to be examined by using X-ray signals detected by the X-ray detecting apparatus 20.

The control device 30 may include additional hardware components, such as, a user interface unit (or a user interface module) for performing user manipulation with respect to the X-ray imaging system 1 and display of information associated with processing performed in the X-ray imaging system 1 and a memory for storing the detected X-ray, the generated X-ray image, and the like.

Figure 2A:
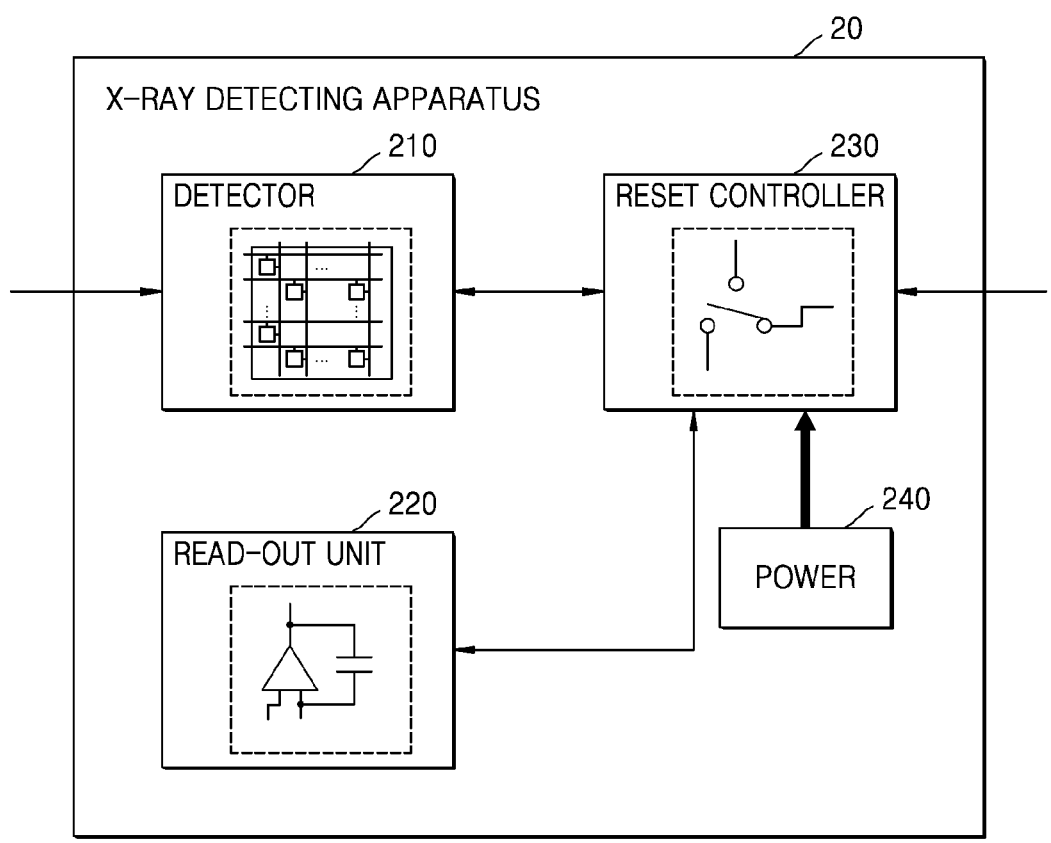
FIG. 2A is a block diagram illustrating a hardware structure of an X-ray detecting apparatus included in the X-ray imaging system of FIG. 1, according to an example embodiment.

FIG. 2A is a block diagram illustrating a hardware structure of the X-ray detecting apparatus 20, according to an example embodiment.

Referring to FIG. 2A, the X-ray detecting apparatus 20 may include a detector 210, a read-out unit (or a read-out module) 220, a reset controller 230, and a reset power source 240. Only components related with some example embodiments from among the components of the X-ray detecting apparatus 20 are shown in FIG. 2A. It will be understood by one of ordinary skill in the art that additional components other than the components illustrated in FIG. 2A may be further included, such as general-use components.

The detector 210 may include a pixel array in which a plurality of pixels for detecting an X-ray transmitted by a body to be examined are arranged in a matrix form. The pixel array of the detector 210 may detect the X-ray that has been transmitted by the part of the patient 2 that is to be examined. The detector 210 may detect the transmitted X-ray by photoelectric converting an X-ray radiated to the pixels into an electrical signal. A detailed structure and operation of the detector 210 will be described in detail later with reference to FIGS. 5-7.

The read-out unit 220 may read out electrical signals corresponding to the detected X-ray from the detector 210, in units of a desired (and/or predetermined) line of the pixel array. The desired (and/or predetermined) line unit may be a column line unit or a row line unit of the pixel array. Although the read-out unit 220 may read out the electrical signals corresponding to the detected X-ray from the detector 210 in units of row lines in some example embodiments below, the example embodiments are not limited thereto, and the read-out unit 220 may read out the electrical signals in units of column lines. When the electrical signals are read out in units of row lines or column lines, only the type of line is changed, and a connection relation between the read-out unit 220 and the detector 210 does not change. The electrical signals read out by the read-out unit 220 may be transmitted to the control device 30 of FIG. 1. The control device 30 may generate an X-ray image by using the read-out electrical signals.

The read-out unit 220 may be implemented by using a Read-Out Integrated Circuit (ROIC) that may include read-out devices connected to each of the first through m-th columns (where m is a natural number) of the pixel array. Alternatively, the ROIC may include a single read-out device, or a plurality of read-out devices that number less than M, may be connected to the columns of the pixel array. A circuit structure and a circuit operation for a read-out operation of the read-out unit 220 may be known to one of ordinary skill in the art, and detailed descriptions thereof are omitted herein.

The reset controller 230 may control the pixel array to be reset after the X-ray is detected, and may perform switching so that reset power of the reset power source 240 that may be commonly connected to the plurality of pixels of the pixel array of the detector 210 may be supplied.

In a reset mode for resetting the pixel array of the detector 210, the reset controller 230 may control switching so that the plurality of pixels of the pixel array may be commonly connected to the reset power source 240. However, in a read-out mode for reading out the electrical signals from the detector 210, the reset controller 230 may control switching so that the plurality of pixels of the pixel array may be commonly connected to the read-out unit 220.

The reset controller 230 may be implemented by using a switch that may be connected between the detector 210 and the read-out unit 220. The reset controller 230 may include a switch connected to each of the m columns of the pixel array. The switches may be implemented so as to be commonly connected to the reset power source 240.

In more detail, when a pair of read-out units 220 is respectively connected to both ends of the detector 210, the reset controller 230 may include m pairs of switches that are connected to both ends of the m columns of the pixel array of the detector 210. Alternatively, when a read-out unit 220 is connected to one end of the detector 210, the reset controller 230 may include m switches each of which is connected to one end of each of the m columns of the pixel array of the detector 210.

A detailed structure and operation of the reset controller 230 will be described in detail later with reference to FIG. 3 and FIGS. 8A-12.

The reset power source 240 may be a power source that may be commonly provided to the pixels of the pixel array of the detector 210 in order to reset each of the pixels simultaneously, in a reset mode. Since reset power may be supplied to the entire pixel array of the detector 210 by the single reset power source 240, occurrence of an offset between the pixels of the pixel array of the detector 210 may be reduced, and an operation time for resetting the detector 210 may also be reduced.

The reset power source 240 may be power that is generated by a Low Drop Out (LDO) regulator, a direct current (DC)-to-DC converter, an alternating current (AC)-to-DC converter, or the like. According to an example embodiment illustrated in FIG. 2A, the reset power source 240 may be implemented to be included in the X-ray detecting apparatus 20.

Figure 2B:
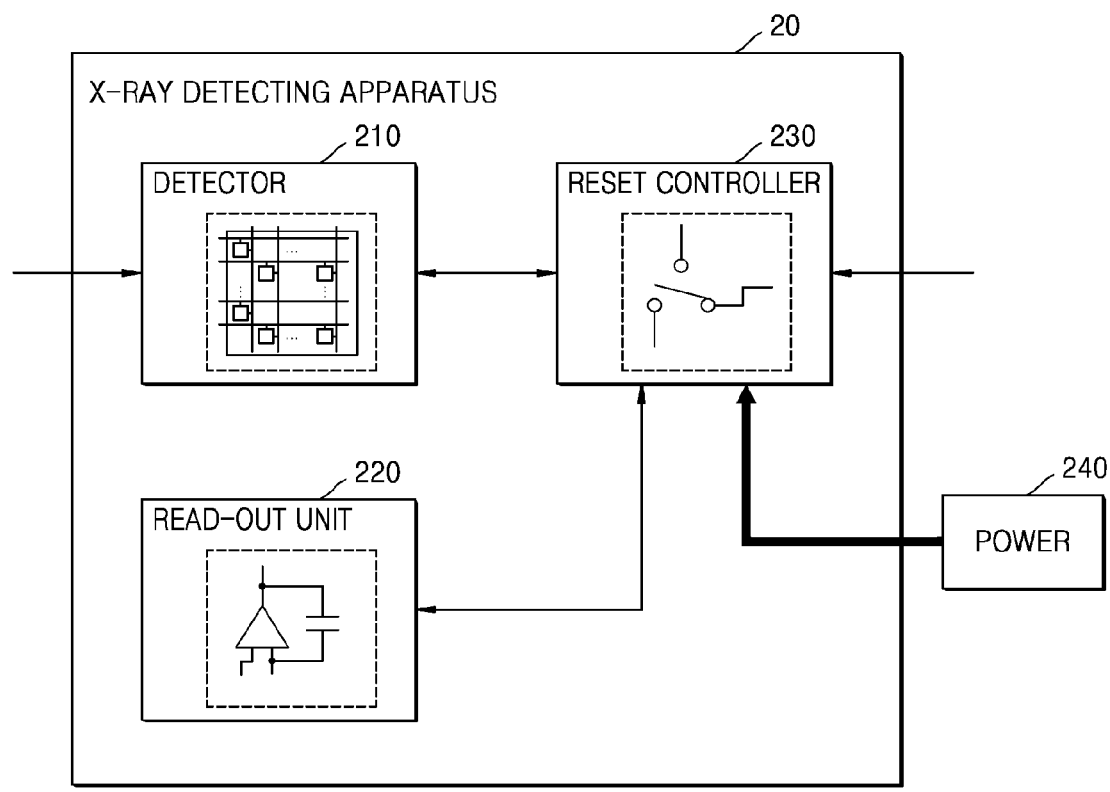
FIG. 2B is a block diagram illustrating a hardware structure of the X-ray detecting apparatus, according to another example embodiment.

FIG. 2B is a block diagram illustrating a hardware structure of the X-ray detecting apparatus 20, according to another example embodiment.

Referring to FIG. 2B, the X-ray detecting apparatus 20 may include a detector 210, a read-out unit 220, and a reset controller 230, similar to the structure illustrated in FIG. 2A. Operations and functions of the detector 210, the read-out unit 220, the reset controller 230, and the reset power source 240 of the X-ray detecting apparatus 20 of FIG. 2B may be the same as those described above with reference to FIG. 2A.

However, the X-ray detecting apparatus 20 of FIG. 2B may not include the reset power source 240, in contrast with FIG. 2A. For example, the reset power source 240 may be included in the control device 30 of FIG. 1 or in the X-ray radiating apparatus 10 of FIG. 1. Alternatively, the reset power source 240 may be a power source that exists outside the X-ray imaging system 1. In other words, the reset power source 240 of FIG. 2B may exist anywhere outside the X-ray detecting apparatus 20.

The X-ray detecting apparatus 20 which will be described below may perform an X-ray detection operation, a read-out operation, and a reset operation regardless of a location of the reset power source 240.

Figure 3:
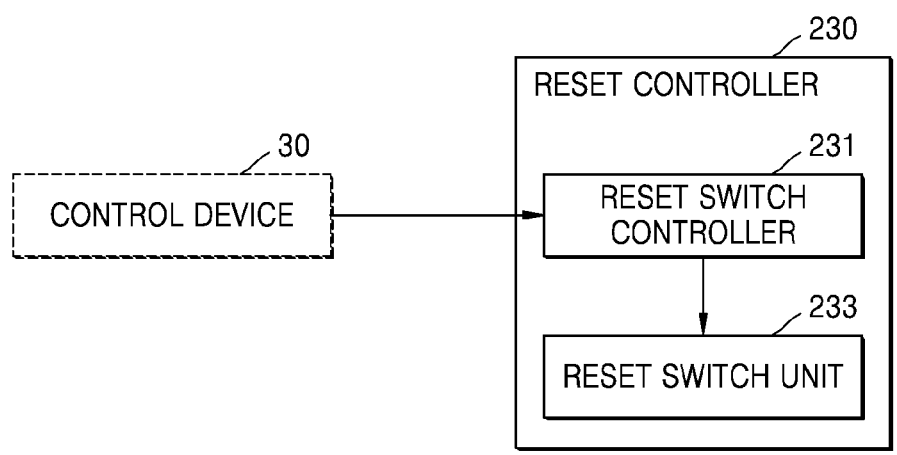
FIG. 3 is a block diagram illustrating a hardware structure of a reset controller included in the X-ray detecting apparatus, according to an example embodiment.

FIG. 3 is a block diagram illustrating a hardware structure of the reset controller 230, according to an example embodiment.

Referring to FIG. 3, the reset controller 230 includes a reset switch controller 231 and a reset switch unit (or a reset switch module) 233. Only components related with some example embodiments from among the components of the reset controller 230 are shown in FIG. 3. It will be understood by one of ordinary skill in the art that additional components other than the components illustrated in FIG. 3 may be further included, such as general-use components.

The reset switch controller 231 may receive a switching signal for controlling a switching operation of the reset switch unit 233 from the control device 30 and may control the reset switch unit 233 based on the received switching signal. The reset switch unit 233 may include a switch (not shown) which switches to a reset mode in which the detector 210 may be connected to the reset power source 240 and a read-out mode in which the detector 210 may be connected to the read-out unit 220. The switch of the reset switch unit 233 may be controlled by the switching signal of the reset switch controller 231. A reset operation or a read-out operation of the reset controller 230 may be controlled by the control device 30.

As illustrated in FIG. 3, the control device 30 may provide a reset mode signal representing the reset mode to the reset switch controller 231, and the reset switch controller 231 may generate a first switching signal for switching the reset switch unit 233 so that the pixel array of the detector 210 may be connected to the reset power source 240, based on the reset mode signal. The reset switch unit 233 may be switched so that the pixel array of the detector 210 may be connected to the reset power source 240, according to the first switching signal received from the reset switch controller 231. Similarly, the control device 30 may provide a read-out mode signal representing the read-out mode to the reset switch controller 231, in order to perform a read-out operation. Accordingly, the reset switch controller 231 may generate a second switching signal for switching the reset switch unit 233 so that the pixel array of the detector 210 may be connected to the read-out unit 220, based on the read-out mode signal, and the reset switch unit 233 may be switched according to the second switching signal so that the pixel array of the detector 210 may be connected to the read-out unit 220.

In a different example embodiment from the example embodiment of FIG. 3, the control device 30 may generate the first switching signal and the second switching signal for controlling a switching operation of the reset switch unit 233. In detail, in a reset mode, the control device 30 may control the reset switch unit 233 that may be switched according to the reset mode, by directly transmitting the first switching signal to the reset switch unit 233. In a read-out mode, the control device 30 may control the reset switch unit 233 that may be switched according to the read-out mode, by directly transmitting the second switching signal to the reset switch unit 233. In such an example embodiment, in contrast with FIG. 3, the reset controller 230 may not include the reset switch controller 231, but example embodiments are not limited thereto.

Figure 4:
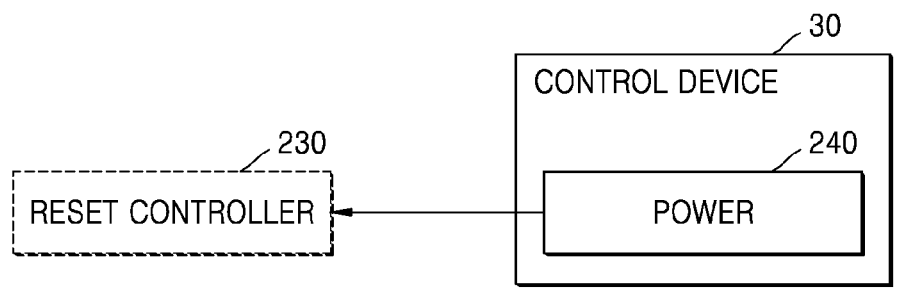
FIG. 4 is a block diagram illustrating a reset power source included outside the X-ray detecting apparatus, according to an example embodiment.

FIG. 4 is a block diagram illustrating a reset power source 240 included outside of the X-ray detecting apparatus 20, according to an example embodiment.

Referring to FIG. 4, the reset power source 240 may correspond to a power supply, such as an LDO regulator, a DC-to-DC converter, an AC-to-DC converter, or the like, within the control device 30. The reset power source 240 may be provided to the detector 210 by switching of the reset controller 230 in order to reset the pixel array of the detector 210 in the reset mode. However, as discussed above, the reset power source may also exist inside the X-ray detecting apparatus 20, the X-ray radiating apparatus 10, or anywhere outside the X-ray detecting apparatus 20, and is not limited to existing inside the control device 30.

Figure 5:
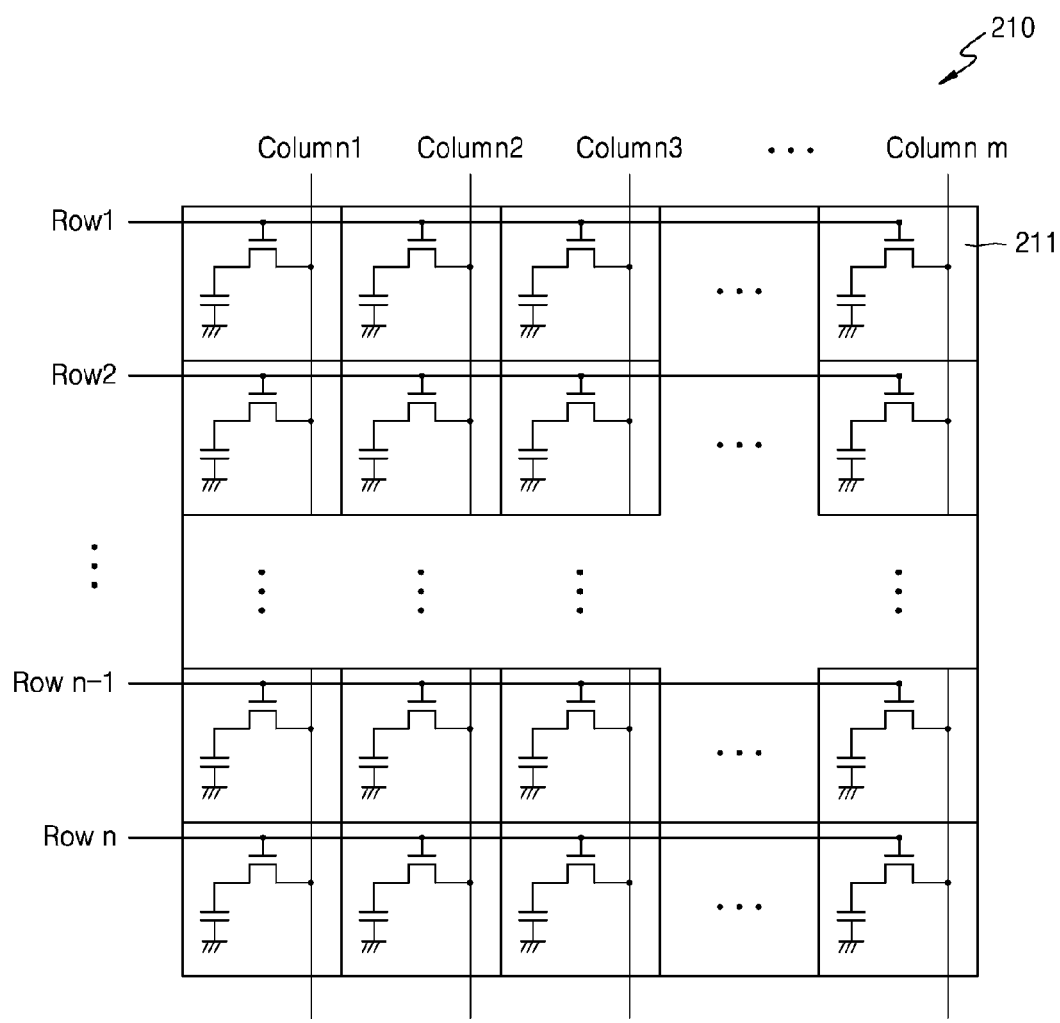
FIG. 5 is a diagram illustrating a circuit structure of a detector included in the X-ray detecting apparatus, according to an example embodiment.

FIG. 5 is a diagram illustrating a circuit structure of the detector 210, according to an example embodiment.

Referring to FIG. 5, the detector 210 may include a pixel array in which a plurality of pixels 211 are arranged in a matrix having m columns and n rows. The number m of columns and the number n of rows of the pixel array may vary. The number m and the number n are natural numbers.

According to an example embodiment, in the pixel array, column lines may be data lines (DLs) connected to the read-out unit 220, and may be lines via which electrical signals respectively obtained by the pixels 211 may be transmitted to the read-out unit 220. The column lines of the pixel array may be lines via which reset power transmitted from the reset power source 240 to the reset controller 230 may be transmitted to the pixels 211. In the pixel array, row lines may be gate lines (GLs) for activating desired pixels 211 that may drive the gates of the pixels 211.

According to another example embodiment, in contrast with the above description, the column lines of the pixel array may correspond to the GLs of the pixels 211, and the row lines of the pixel array may correspond to the DLs of the pixels 211. However, although it will now be assumed for convenience of explanation that the column lines are DLs and the row lines are GLs, the circuit structure of the detector 210 is not limited to this example embodiment.

Figure 6:
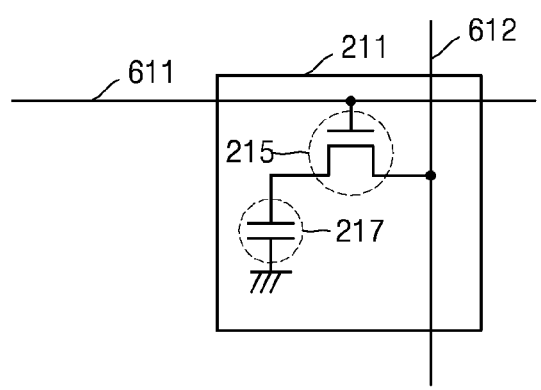
FIG. 6 is a circuit diagram of a pixel of a pixel array of the detector, according to an example embodiment.

FIG. 6 is a circuit diagram of a pixel 211 of the pixel array of the detector 210, according to an example embodiment.

Referring to FIG. 6, the pixel 211 of the pixel array of the detector 210 may include a transistor 215 and a storage capacitor 217. The transistor 215 may be implemented by using a thin film transistor (TFT), or the like. A gate of the transistor 215 may be connected to a GL 611, and thus the transistor 215 may be turned on according to a gate driving signal. Turning on the transistor 215 may denote that the GL 611 has been selected according to an address of the pixel 211. The gate driving signal may be a signal for selecting the pixels connected to a desired row line. According to an example embodiment, the gate driving signal may be directly generated by the control device 30 and may be transmitted to a line selector 810 of FIGS. 8A and 8B, a line selector 910 of FIGS. 9A and 9B, a line selector 1010 of FIGS. 10A and 10B, or a line selector 1110 of FIGS. 11A and 11B, and the line selector 810, 910, 1010 or 1110 may select a GL based on the received gate driving signal. According to another example embodiment, the control device 30 may generate no gate driving signals and may transmit to the line selector 810, 910, 1010 or 1110 only a signal that designates a desired row line. The line selector 810, 910, 1010 or 1110 may generate a gate driving signal by decoding the received signal that designates a desired row line, and may select a GL based on the generated gate driving signal.

The storage capacitor 217 may detect an X-ray as a voltage change that may be as much as a charge amount discharged by the radiated X-ray occurs, when the storage capacitor 217 is charged. The storage capacitor 217 may be charged by the power supplied from the reset power source 240 via a DL 612, in the reset mode. When the transistor 215 is turned on by the gate driving signal in the read-out mode, information about a change in the voltage of the storage capacitor 217 caused by the radiated X-ray may be provided to the read-out unit 220 via the DL 612.

Figure 7:
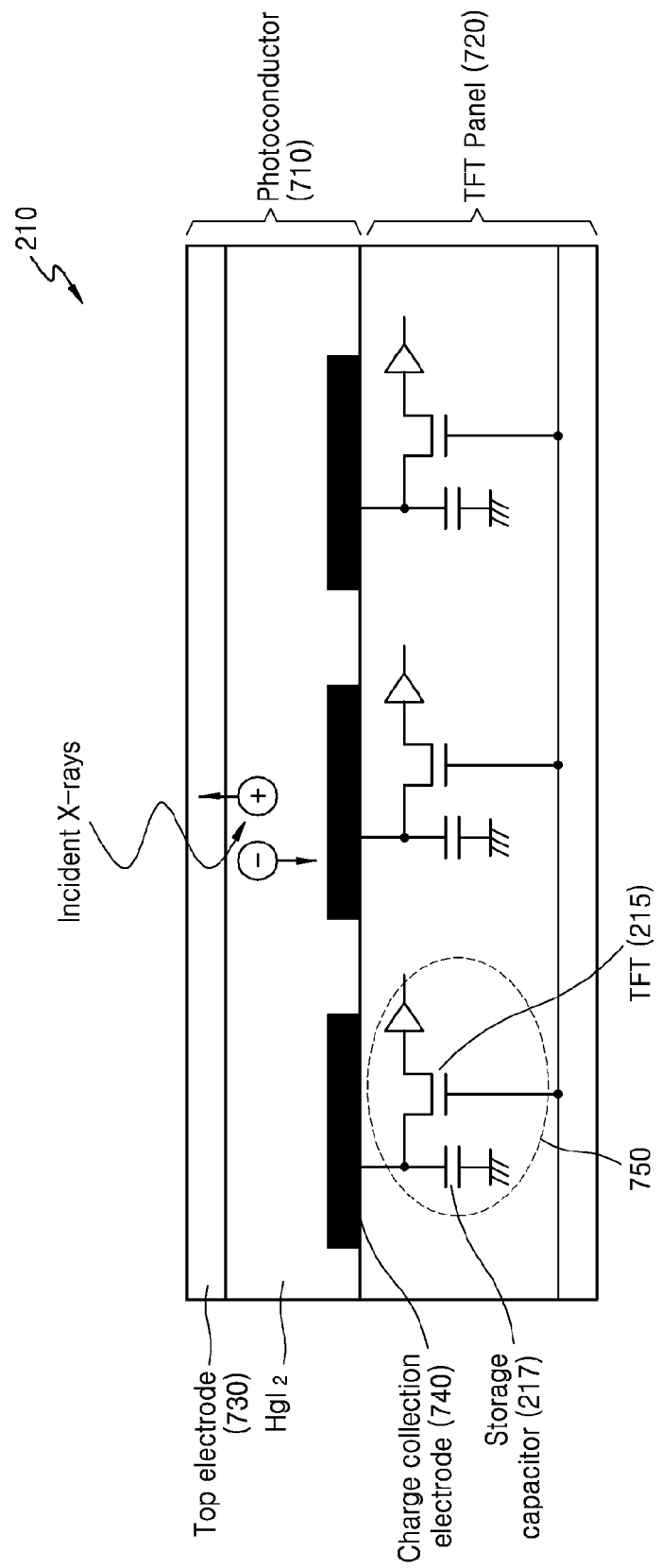
FIG. 7 is a cross-sectional view of the detector for explaining an X-ray detecting operation of the detector according to an example embodiment.

FIG. 7 is a cross-sectional view of the detector 210 for explaining an X-ray detecting operation of the detector 210 according to an example embodiment.

Referring to the cross-section of the detector 210 illustrated in FIG. 7, the detector 210 may include a photoconductor layer 710 and a TFT panel layer 720. The panel layer 720 may also comprise a different transistor type. In the cross-section of the detector 210 of FIG. 7, a charge collection electrode 740 and a pixel circuit 750 correspond to one pixel of the detector 210.

The photoconductor layer 710 may be filled with $HgI_2$, and the charge collection electrode 740 may be formed in the photoconductor layer 710 at a boundary between the photoconductor layer 710 and the TFT panel layer 720. A top electrode 730 may be disposed on an upper surface of the photoconductor layer 710 on which an X-ray is incident.

The pixel circuit 750 may be included in the TFT panel layer 720. The pixel circuit 750 may have the circuit structure of the pixel 211 described above with reference to FIG. 6. Accordingly, the pixel circuit 750 may include a TFT 215 and a storage capacitor 217.

The X-ray incident on the photoconductor layer 710 may release holes accumulated in the charge collection electrode 740 that may be included in the photoconductor layer 710. Thus, the amount of charge filled in the storage capacitor 217 connected to the charge collection electrode 740 may change, and accordingly a voltage of the storage capacitor 217 may change. The detector 210 may photoelectric-convert the incident X-ray into an electrical signal by using the voltage change of the storage capacitor 217 that may correspond to the intensity of the incident X-ray.

Figure 8A:
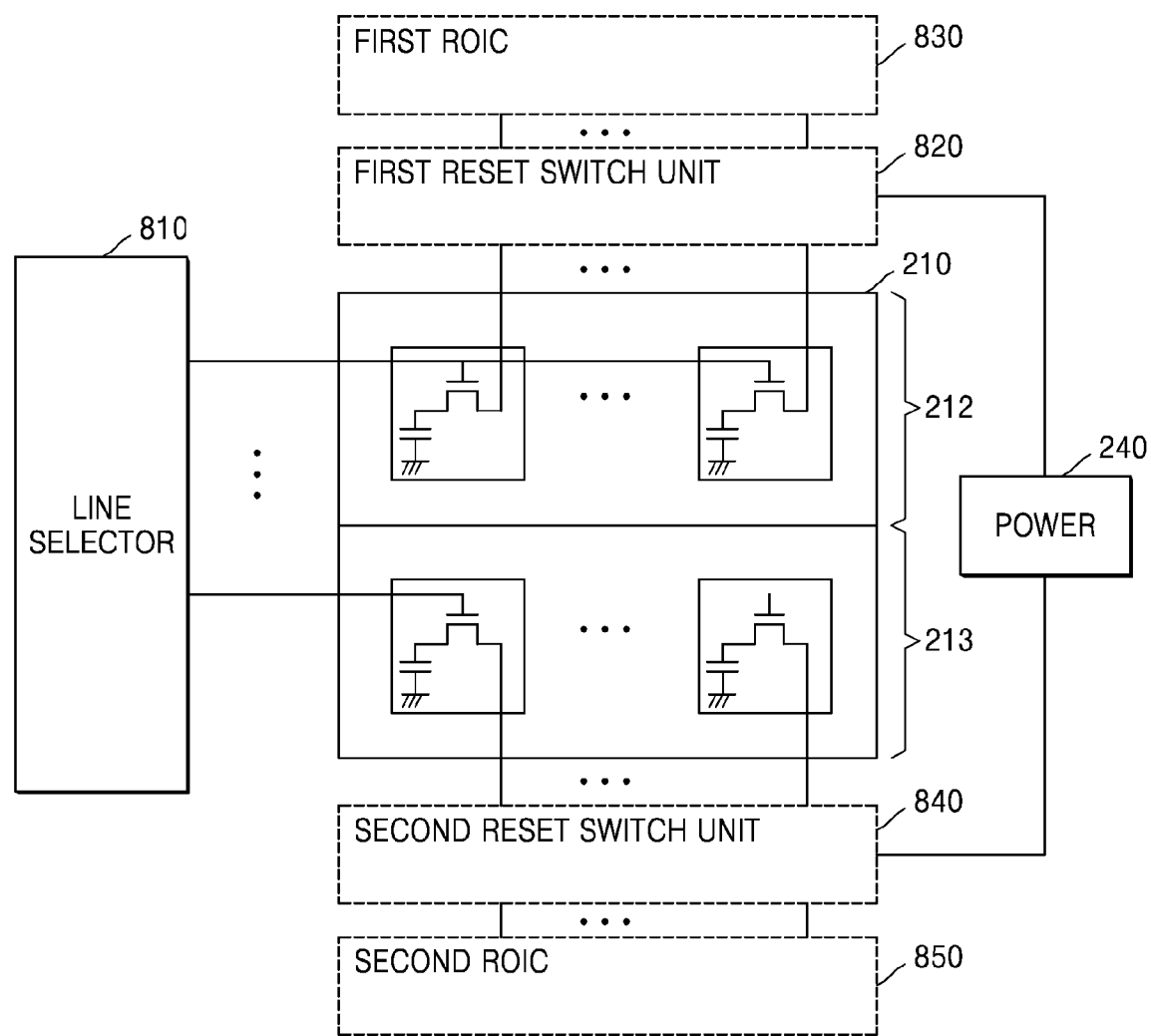
FIG. 8A is a schematic diagram illustrating a circuit structure of the X-ray detecting apparatus, according to an example embodiment.

FIG. 8A is a schematic diagram illustrating a circuit structure of the X-ray detecting apparatus 20, according to an example embodiment.

Referring to FIG. 8A, the read-out unit 220 may be implemented by using a pair of first and second ROICs 830 and 850, which are respectively connected to both ends of the detector 210. Accordingly, the plurality of pixels of the pixel array of the detector 210 may be divided into a first region 212 and a second region 213. The first ROIC 830 of the read-out unit 220 may read out an electrical signal corresponding to an X-ray detected from the pixels included in the first region 212, and the second ROIC 850 of the read-out unit 220 may read out an electrical signal corresponding to an X-ray detected from the pixels included in the second region 213. The number of pixels that belong to the first region 212 may be equal to or different from the number of pixels that belong to the second region 213. Additionally, the number of ROICs in the read-out unit 220 may be greater or lesser than the number of ROICs depicted in FIG. 8A, while providing similar or the same functionality as discussed above.

A pair of first and second reset switch units (or first and second reset switch modules) 820 and 840 of the reset controller 230 may be respectively connected between the first ROIC 830 and the detector 210 and between the second ROIC 850 and the detector 210. The first and second reset switch units 820 and 840 may be commonly connected to the reset power source 240. The first reset switch unit 820 may control a reset operation of the pixels that belong to the first region 212, and the second reset switch unit 840 may control a reset operation of the pixels that belong to the second region 213. The number of reset switch units may be greater or lesser than the number of reset switch units depicted in FIG. 8A, while providing similar or the same functionality as discussed above.

The line selector 810 may select a line of the pixel array, based on the gate driving signal according to the example embodiment illustrated in FIG. 6 or the above-described different example embodiment therefrom. The line may correspond to a row line of the pixel array, but example embodiments are not limited thereto. As described above, the reset power source 240 may be included inside or outside the X-ray detecting apparatus 20.

Figure 8B:
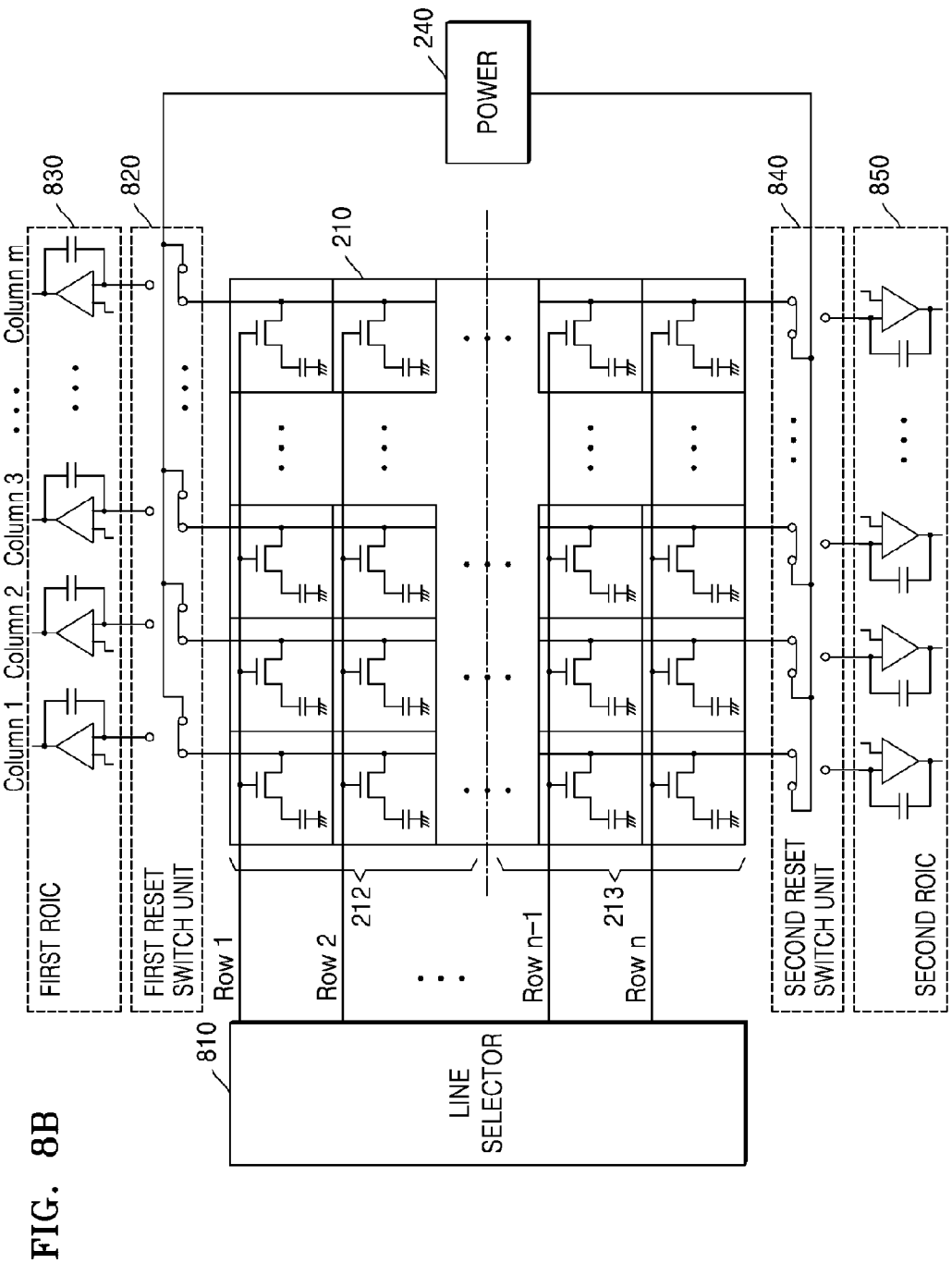
FIG. 8B is a schematic diagram illustrating the hardware structure of the X-ray detecting apparatus example embodiment illustrated in FIG. 8A in greater detail.

FIG. 8B is a schematic diagram illustrating an example embodiment of the hardware structure of the X-ray detecting apparatus 20 illustrated in FIG. 8A in greater detail.

Referring to FIG. 8B, the pixel array of the detector 210 may be divided into pixels of the first region 212 and pixels of the second region 213. Each of the pixels of the pixel array may have the circuit structure of FIG. 6 or the like. The pixels that belong to the first region 212 and the second region 213 of the detector 210 may be connected to the line selector 810 via row lines. The row lines may be connected to the pixels are GLs, and may be connected to the gates of transistors included in pixel circuits. Consequently, the line selector 810 may select pixels in units of row lines.

The first reset switch unit 820 may be connected to one end of each of column lines (i.e., DLs) connected to the pixels of the pixel array of the detector 210, and the second reset switch unit 840 may be connected to the other end of each of the column lines. For example, the first reset switch unit 820 may be connected to only the pixels that belong to the first region 212, and the second reset switch unit 840 may be connected to only the pixels that belong to the second region 213. The first reset switch unit 820 may include m reset switches respectively connected to the m column lines of the pixels included in the first region 212. The second reset switch unit 840 may include m reset switches respectively connected to the m column lines of the pixels included in the second region 213. However, example embodiments are not limited thereto, and the reset switch units may include reset switches greater than or less than M, while providing functionality similar to or the same as the above described example embodiment.

The reset power source 240 may be commonly connected to the first reset switch unit 820 and the second reset switch unit 840. Accordingly, the reset power source 240 may be commonly connected to the pixels of the first region 212 and the second region 213 of the detector 210 via the first reset switch unit 820 and the second reset switch unit 840.

The first ROIC 830 of the read-out unit 220 may be connected to the pixels that belong to the first region 212 via the first reset switch unit 820, and the second ROIC 850 of the read-out unit 220 may be connected to the pixels that belong to the second region 213 via the second reset switch unit 840. In terms of location, the first reset switch unit 820 may be connected between the first ROIC 830 of the read-out unit 220 and the first region 212 of the detector 210, and the second reset switch unit 840 may be connected between the second ROIC 850 of the read-out unit 220 and the second region 213 of the detector 210.

A reset switch of an i-th column (where i is a natural number equal to or greater than 1 and less than or equal to m) of the first reset switch unit 820 may be switched to connect the pixels of the i-th column included in the first region 212 with the reset power source 240 or connection of the pixels of the i-th column included in the first region 212 with the first ROIC 830. Similarly, a reset switch of an i-th column of the second reset switch unit 840 may be switched to connect the pixels of the i-th column included in the second region 213 with the reset power source 240 or connection of the pixels of the i-th column included in the second region 213 with the second ROIC 850.

First, when describing an overall operation of the X-ray detecting apparatus 20 in the read-out mode, the line selector 810 may sequentially select the row lines of the pixel array in order to read out the pixels of the pixel array in units of row lines. At this time, in the read-out mode, the line selector 810 may select the row lines of the first region 212 and the row lines of the second region 213, in parallel.

In the read-out mode, the reset switch of the i-th column of the first reset switch unit 820 may be switched so that the pixels of the i-th column that belongs to the first region 212 may be connected to the first ROIC 830. Similarly, in the read-out mode, the reset switch of the i-th column of the second reset switch unit 840 may be switched so that the pixels of the i-th column that belongs to the second region 213 may be connected to the second ROIC 850.

A specific row line of the first region 212 may be selected by the line selector 810 and the first reset switch unit 820 may be switched so that the selected row line may be connected to the first ROIC 830, the first ROIC 830 may read out electrical signals of the pixels of the selected row line. Similarly, a specific row line of the second region 213 may be selected by the line selector 810 and the second reset switch unit 840 may be switched so that the selected row line may be connected to the second ROIC 850, the second ROIC 850 may read out electrical signals of the pixels of the selected row line.

Next, when describing an overall operation of the X-ray detecting apparatus 20 in the reset mode, the line selector 810 may simultaneously select all of the row lines of the pixel array in order to simultaneously reset all of the pixels of the pixel array. However, in the reset mode, the line selector 810 may sequentially select the row lines of the pixel array.

In the reset mode, the reset switch of the i-th column of the first reset switch unit 820 may be switched so that the pixels of the i-th column that belong to the first region 212 may be connected to the reset power source 240. Similarly, in the reset mode, the reset switch of the i-th column of the second reset switch unit 840 may be switched so that the pixels of the i-th column that belongs to the second region 213 may be connected to the reset power source 240.

All of the row lines of the pixel array may be simultaneously selected so that all of the pixels of the pixel array may be simultaneously reset by the line selector 810, and the first reset switch unit 820 and the second reset switch unit 840 may be switched so that all of the pixels of the pixel array may be connected to the reset power source 240, the reset power source 240 may be commonly supplied to all of the pixels of the pixel array via the column lines in the reset mode. Thus, all of the pixels of the pixel array may be simultaneously reset to the same power (i.e., the reset power source 240). The pixels of the pixel array may be reset by supplying the reset power source 240 to the storage capacitors included in the pixel circuits included in the pixels.

As such, a reset operation may be quickly performed by simultaneously supplying the same power (i.e., the reset power source 240) to all of the pixels of the pixel array, and an offset between the pixels may be reduced.

Figure 9A:
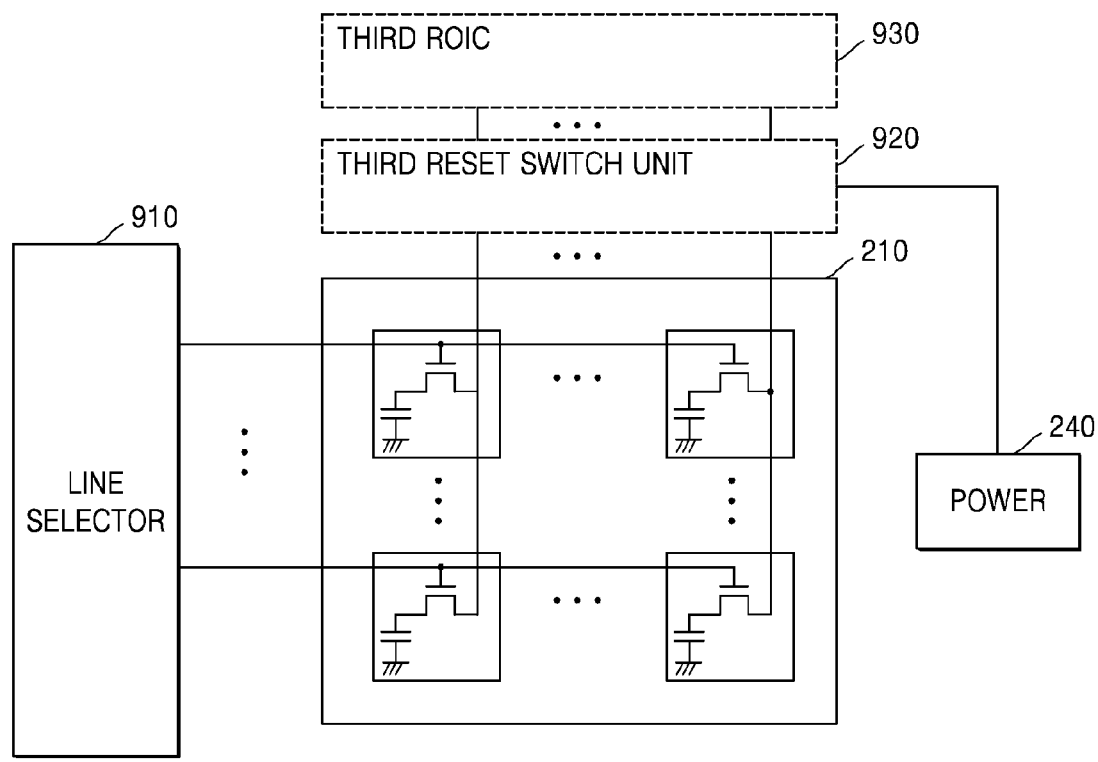
FIG. 9A is a schematic diagram illustrating a circuit structure of the X-ray detecting apparatus, according to another example embodiment.

FIG. 9A is a schematic diagram illustrating a circuit structure of the X-ray detecting apparatus 20, according to another example embodiment.

Referring to FIG. 9A, in contrast with FIG. 8A, the read-out unit 220 may be implemented by using a third ROIC 930 connected to one end of the detector 210. Accordingly, the plurality of pixels of the pixel array of the detector 210 are not divided into regions. The third ROIC 930 of the read-out unit 220 may read out an electrical signal corresponding to an X-ray detected from all of the pixels of the pixel array. A third reset switch unit (a third reset switch module) 920 of the reset controller 230 may be connected between the third ROIC 930 and the detector 210. The third reset switch unit 920 may be connected to the reset power source 240 and may control a reset operation with respect to all of the pixels of the pixel array. As described above, the reset power source 240 may be included inside or outside the X-ray detecting apparatus 20.

The line selector 910 may select a line of the pixel array, based on the gate driving signal according to the example of FIG. 6 or the above-described different example embodiments therefrom. The line may correspond to a row line of the pixel array, but example embodiments are not limited thereto.

Figure 9B:
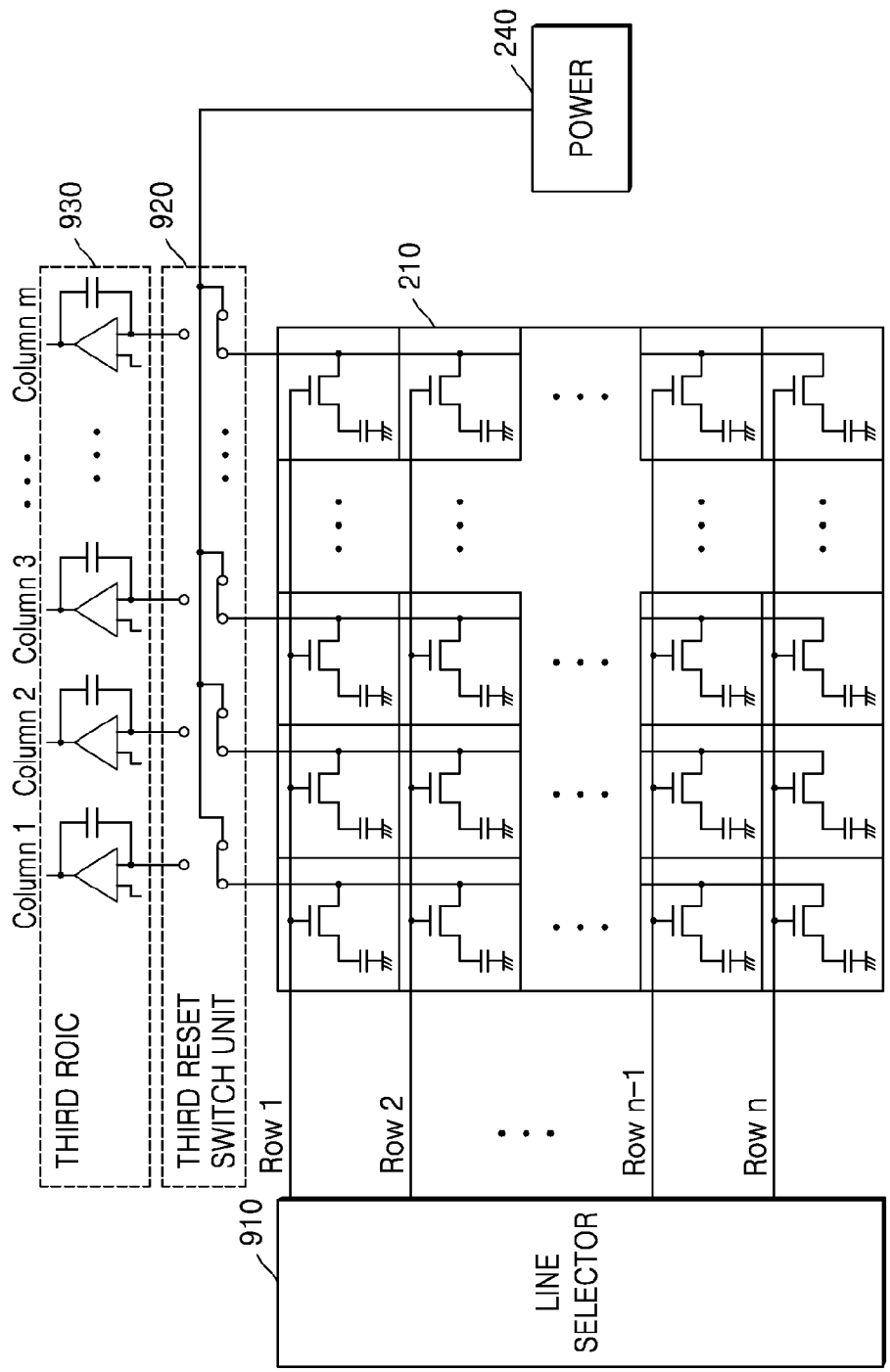
FIG. 9B is a schematic diagram illustrating the hardware structure of the X-ray detecting apparatus example embodiment illustrated in FIG. 9A in greater detail.

FIG. 9B is a schematic diagram illustrating an example embodiment of the hardware structure of the X-ray detecting apparatus 20 illustrated in FIG. 9A in greater detail.

Referring to FIG. 9B, in contrast with FIG. 8B, the pixel array of the detector 210 may not be divided into regions. Each of the pixels of the pixel array may have the circuit structure of FIG. 6 or the like.

In contrast with FIG. 8B, the third reset switch unit 920 may be connected to only one end of each of the column lines (i.e., DLs) connected to the pixels of the pixel array of the detector 210. Due to this structural difference, in contrast with FIG. 8B, the third reset switch unit 920 may be connected to all of the pixels of the pixel array and may be switched to perform a read-out operation or a reset operation. The principles of the read-out operation and the reset operations are similar to those described above with reference to FIG. 8B, and thus detailed descriptions thereof are omitted herein.

Figure 10A:
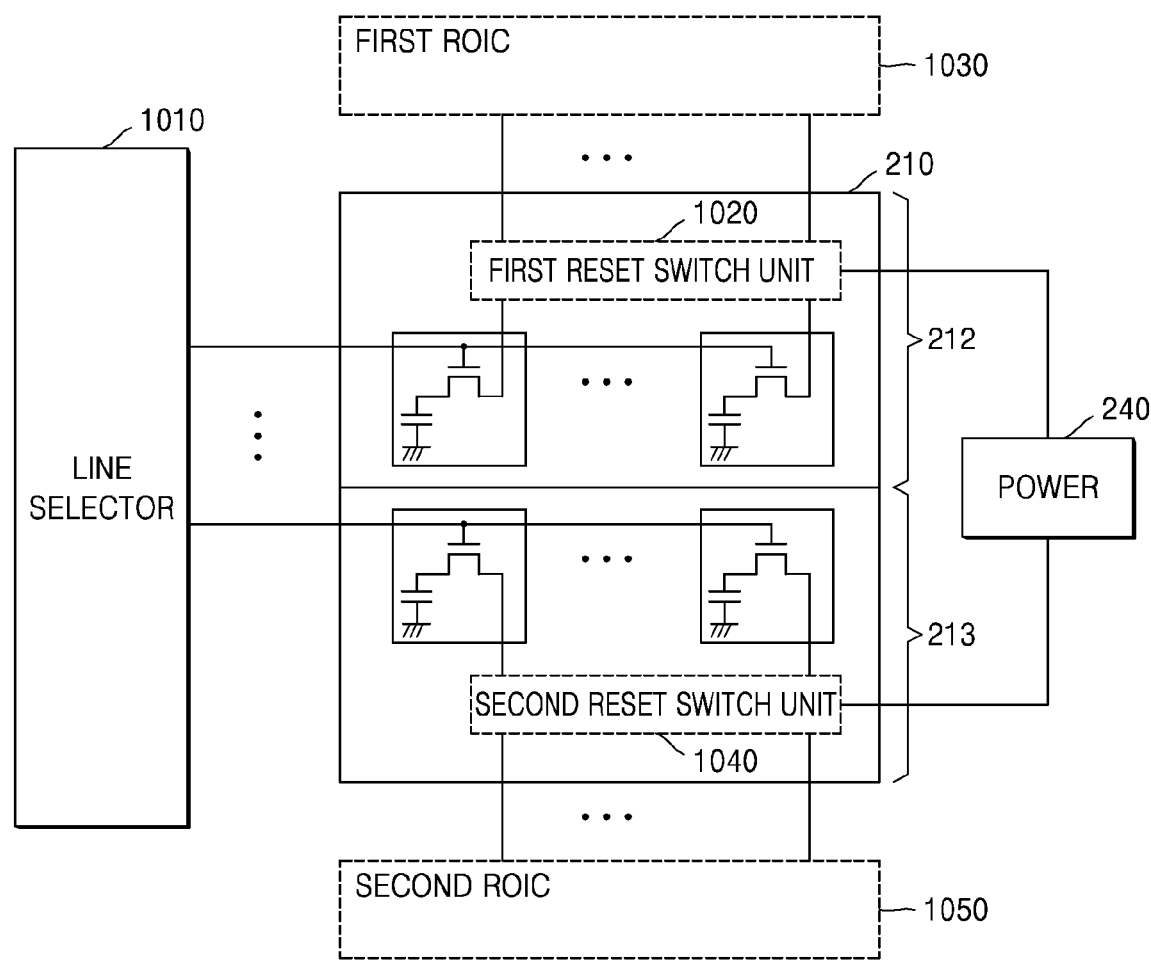
FIG. 10A is a schematic diagram illustrating a circuit structure of the X-ray detecting apparatus, according to another example embodiment.

FIG. 10A is a schematic diagram illustrating a circuit structure of the X-ray detecting apparatus 20, according to another example embodiment.

Referring to FIG. 10A, similar to FIG. 8A, the read-out unit 220 may be implemented by using a pair of first and second ROICs 1030 and 1050, which are respectively connected to both ends of the detector 210. However, first and second reset switch units 1020 and 1040 of the reset controller 230 of FIG. 10A may be in the detector 210, in contrast with the first and second reset switch units 820 and 840 of FIG. 8A that are outside the detector 210. The first and second reset switch units 1020 and 1040 of FIG. 10A may be also connected between the pixel array of the detector 210 and the first ROIC 1030 and between the pixel array of the detector 210 and the second ROIC 1050, similar to the first and second reset switch units 820 and 840 of FIG. 8A. An overall operation of the X-ray detecting apparatus 20 of FIG. 10A may be the same as that described above with reference to FIG. 8A, and thus descriptions of the overall operation with reference to FIG. 8A may also apply to the overall operation of FIG. 10A.

Figure 10B:
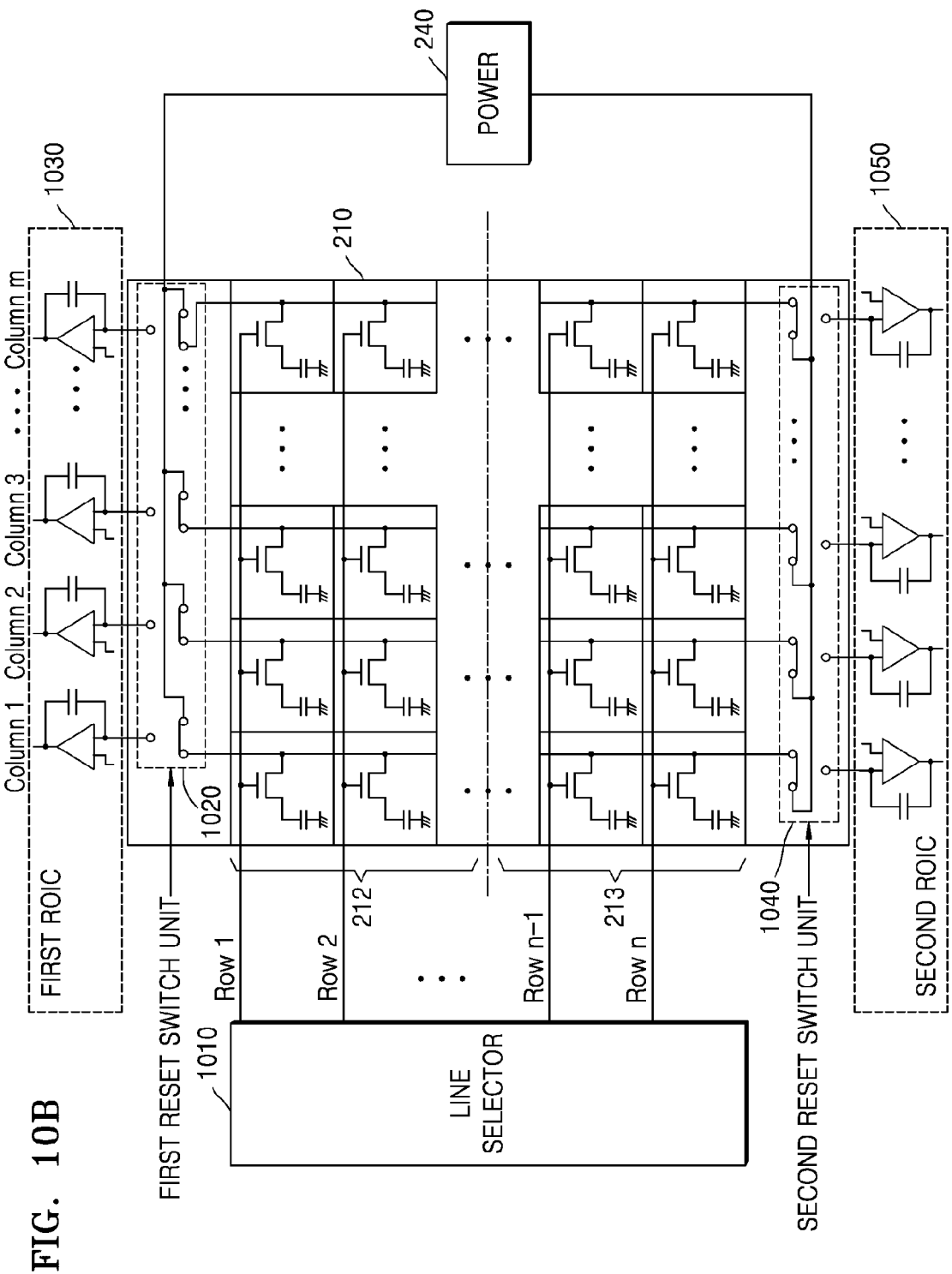
FIG. 10B is a schematic diagram illustrating the hardware structure of the X-ray detecting apparatus example embodiment illustrated in FIG. 10A in greater detail.

FIG. 10B is a schematic diagram illustrating an example embodiment of the hardware structure of the X-ray detecting apparatus 20 illustrated in FIG. 10A in greater detail.

The circuit structure of the X-ray detecting apparatus 20 of FIG. 10B may be similar to that of the X-ray detecting apparatus 20 of FIG. 8B except for the locations of the first and second reset switch units 1020 and 1040.

The first and second reset switch units 1020 and 1040 of the reset controller 230 of FIG. 10B may be in the detector 210, in contrast with the locations of the first and second reset switch units 820 and 840 of FIG. 8B. The first and second reset switch units 1020 and 1040 of FIG. 10B may also be connected between the pixel array of the detector 210 and the first ROIC 1030 and between the pixel array of the detector 210 and the second ROIC 1050, similar to the first and second reset switch units 820 and 840 of FIG. 8B. The first and second reset switch units 1020 and 1040 may be switched for supply of the reset power source 240 in the reset mode or read-out operations of the first and second ROICs 1030 and 1050 in the read-out mode. An overall operation of the X-ray detecting apparatus 20 of FIG. 10B may be the same as that described above with reference to FIG. 8B, and thus descriptions of the overall operation with reference to FIG. 8B may also apply to the overall operation of FIG. 10B.

Figure 11A:
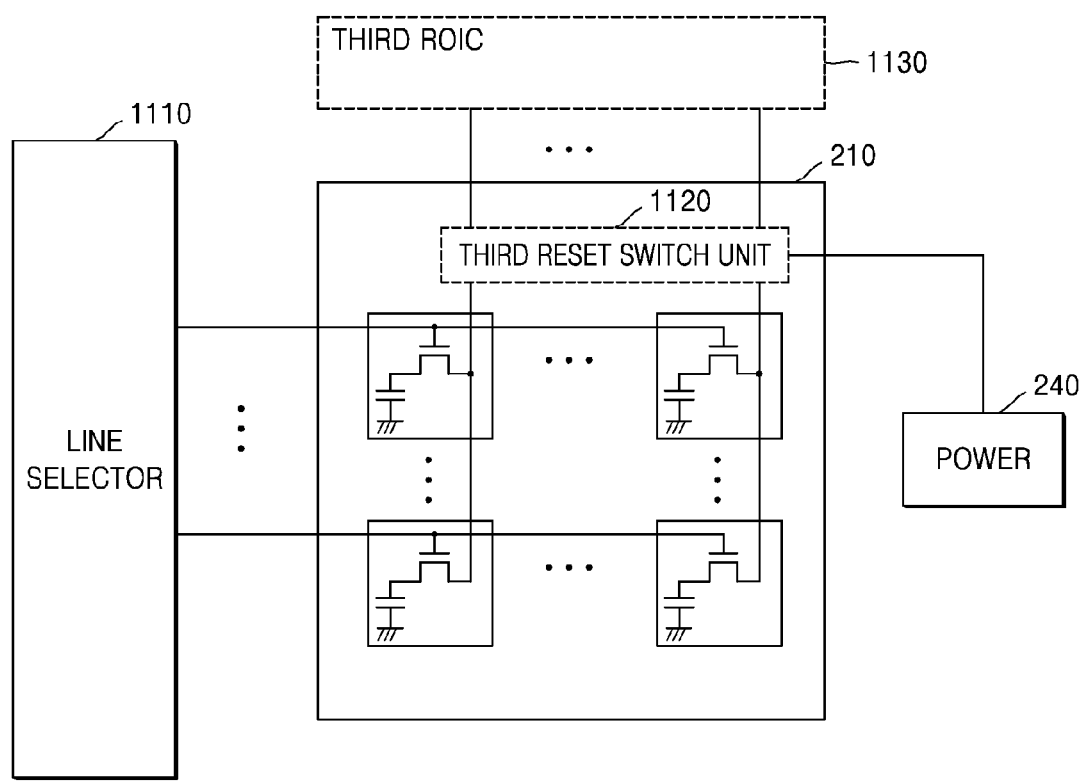
FIG. 11A is a schematic diagram illustrating a circuit structure of the X-ray detecting apparatus, according to another example embodiment.

FIG. 11A is a schematic diagram illustrating a circuit structure of the X-ray detecting apparatus 20, according to another example embodiment.

Referring to FIG. 11A, similar to FIG. 9A, the read-out unit 220 may be implemented by using a third ROIC 1130 connected to one end of the detector 210. However, a third reset switch unit 1120 of the reset controller 230 of FIG. 11A may be positioned within the detector 210, in contrast with the third reset switch unit 920 of FIG. 9A that may be outside the detector 210. The third reset switch unit 1120 of FIG. 11A may also be connected between the pixel array of the detector 210 and the third ROIC 1130, similar to the third reset switch unit 920 of FIG. 9A. An overall operation of the X-ray detecting apparatus 20 of FIG. 11A may be the same as that described above with reference to FIG. 9A, and thus descriptions of the overall operation with reference to FIG. 9A may also apply to the overall operation of FIG. 11A.

Figure 11B:
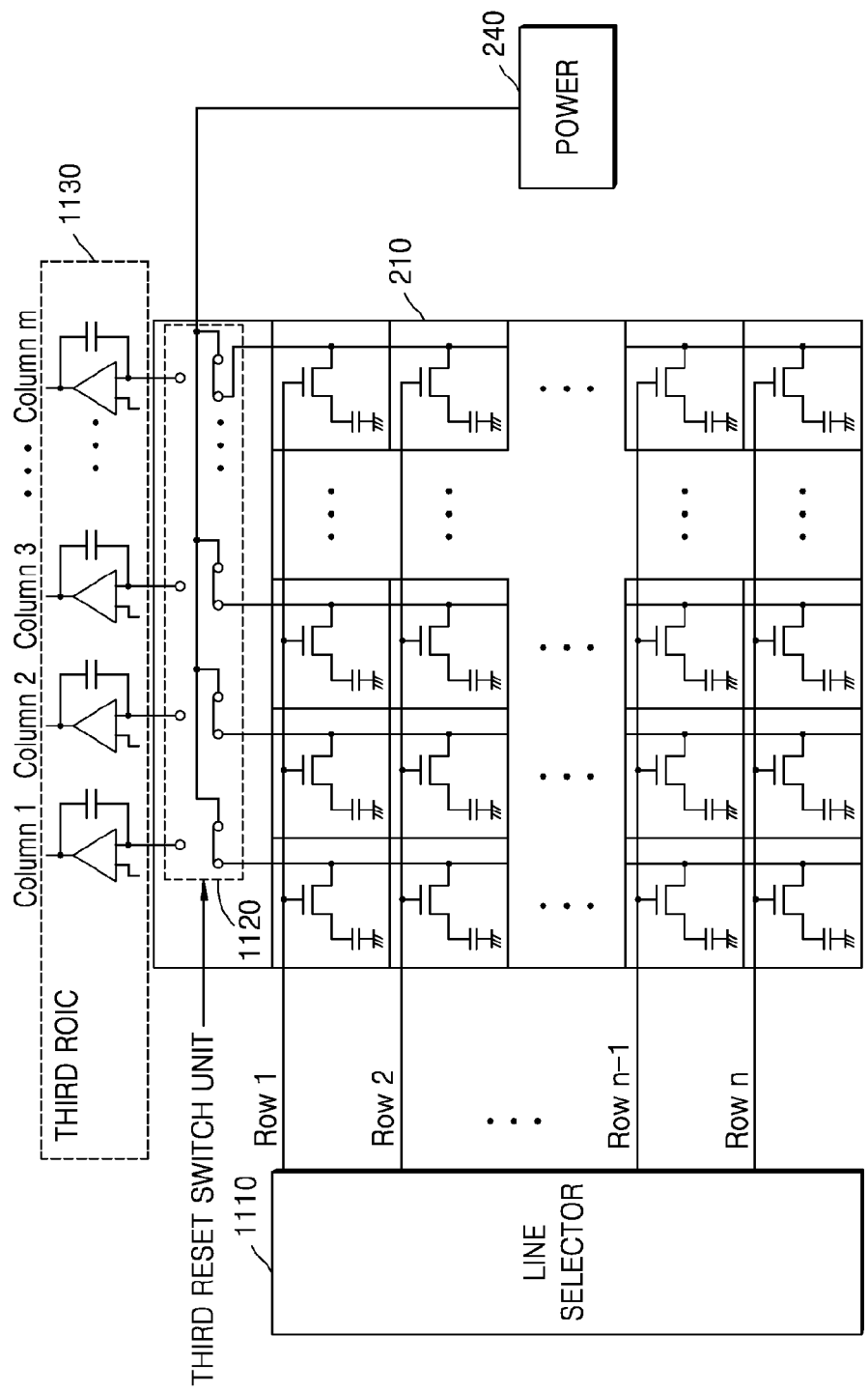
FIG. 11B is a schematic diagram illustrating the hardware structure of the X-ray detecting apparatus example embodiment illustrated in FIG. 11A in greater detail.

FIG. 11B is a schematic diagram illustrating an example embodiment of the hardware structure of the X-ray detecting apparatus 20 illustrated in FIG. 11A in greater detail.

The circuit structure of the X-ray detecting apparatus 20 of FIG. 11B may be similar to that of the X-ray detecting apparatus 20 of FIG. 9B except for the location of the third reset switch unit 1120. The third reset switch unit 1120 of the reset controller 230 of FIG. 11B may be positioned within the detector 210, in contrast with the location of the third reset switch unit 920 of FIG. 9B. The third reset switch unit 1120 of FIG. 11A may also be connected between the pixel array of the detector 210 and the third ROIC 1130, similar to the third reset switch unit 920 of FIG. 9A. The third reset switch unit 1120 of FIG. 11A may be switched for supply of the reset power source 240 in the reset mode or a read-out operation of the third ROIC 1130 in the read-out mode. An overall operation of the X-ray detecting apparatus 20 of FIG. 11B may be the same as that described above with reference to FIG. 9B, and thus descriptions of the overall operation with reference to FIG. 9B may also apply to the overall operation of FIG. 11B.

Figure 12A:
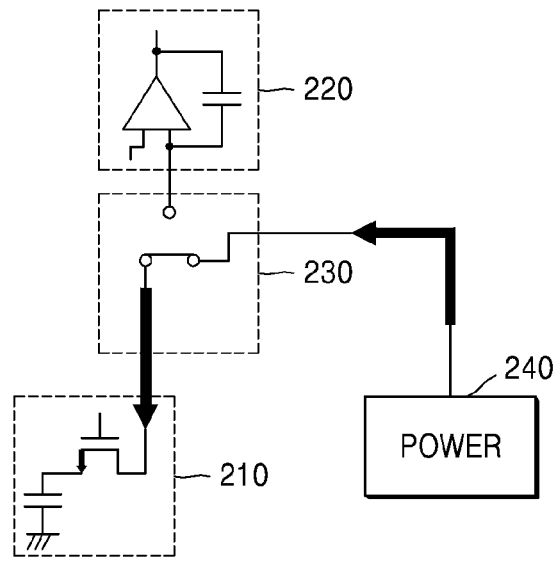
FIGS. 12A and 12B are block diagrams illustrating an operation of the reset controller in a reset mode and an operation thereof in a read-out mode, according to an example embodiment.
Figure 12B:
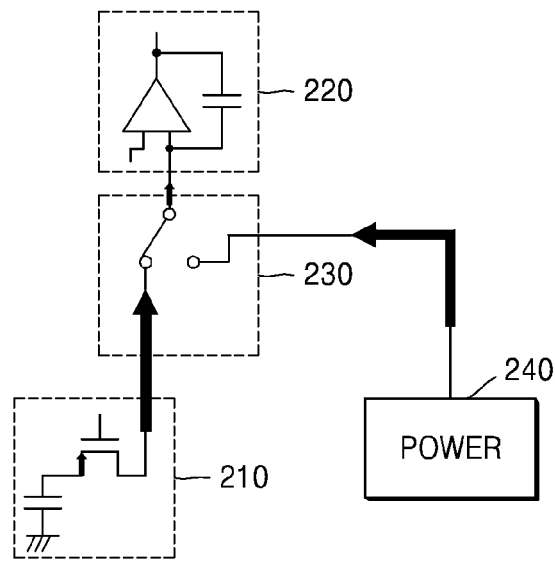

FIGS. 12A and 12B are block diagrams for explaining an operation of the reset controller 230 in the reset mode and an operation thereof in the read-out mode, according to an example embodiment.

FIG. 12A illustrates the operation of the reset controller 230 in the reset mode. Referring to FIG. 12A, in the reset mode, the reset switch of the reset controller 230 may be switched so that the pixels of the pixel array of the detector 210 may be connected to the reset power source 240. Accordingly, the reset power source 240 may be supplied to the storage capacitors of the pixel circuits, and thus the pixels of the detector 210 may be reset.

FIG. 12B illustrates the operation of the reset controller 230 in the read-out mode. Referring to FIG. 12B, in the read-out mode, the reset switch of the reset controller 230 may be switched so that the pixels of the pixel array of the detector 210 may be connected to the read-out unit 220. Accordingly, information about the voltages of the storage capacitors of the pixels of the detector 210 may be read out by the read-out unit 220.

The reset switch of the reset controller 230 may be implemented by using transistor devices. For example, the reset switch of the reset controller 230 may include a first switch implemented by using a transistor between the column line of the i-th column of the detector 210 and the reset power source 240, and a second switch implemented by using a transistor between the column line of the i-th column of the detector 210 and the read-out unit 220. The first and second switches included in the reset switch of the reset controller 230 may operate complementarily in the reset mode or the read-out mode. However, the reset switch of the reset controller 230 may be implemented to have a different circuit structure from the above-described circuit structures, as long as the reset switch of the reset controller 230 may be switched for either connection between the detector 210 and the reset power source 240 or connection between the detector 210 and the read-out unit 220.

Figure 13:
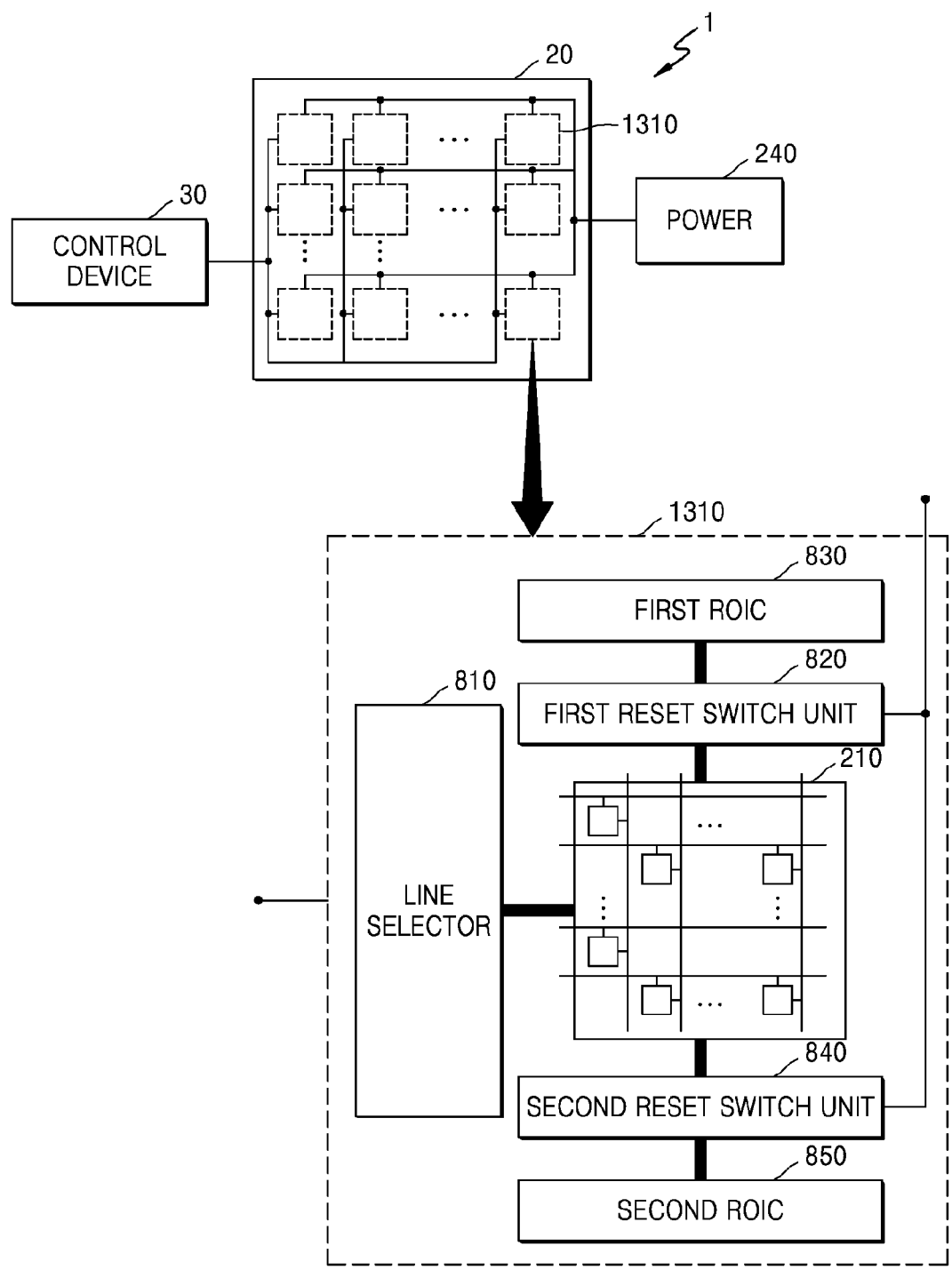
FIG. 13 is a block diagram illustrating an internal structure of the X-ray detecting apparatus of the X-ray imaging system, according to an example embodiment.

FIG. 13 is a block diagram for explaining an internal structure of the X-ray detecting apparatus 20 of the X-ray imaging system 1, according to an example embodiment.

Referring to FIG. 13, the X-ray detecting apparatus 20 in the X-ray imaging system 1 may include a plurality of circuit sets 1310 arranged in a matrix form. However, the X-ray detecting apparatus 20 may include only one circuit set.

Each circuit set 1310 may have the circuit structure of FIG. 8A or 8B. Although the reset power source 240 may exist outside the X-ray detecting apparatus 20 in FIG. 13, example embodiments are not limited thereto, and the reset power source 240 may exist inside the X-ray detecting apparatus 20. An overall operation of the X-ray detecting apparatus 20 of FIG. 13, particularly, an operation of the circuit set 1310, may be the same as the operation described above with reference to FIG. 8A or 8B, and thus descriptions of the operation with reference to FIG. 8A or 8B may also apply to FIG. 13.

Figure 14:
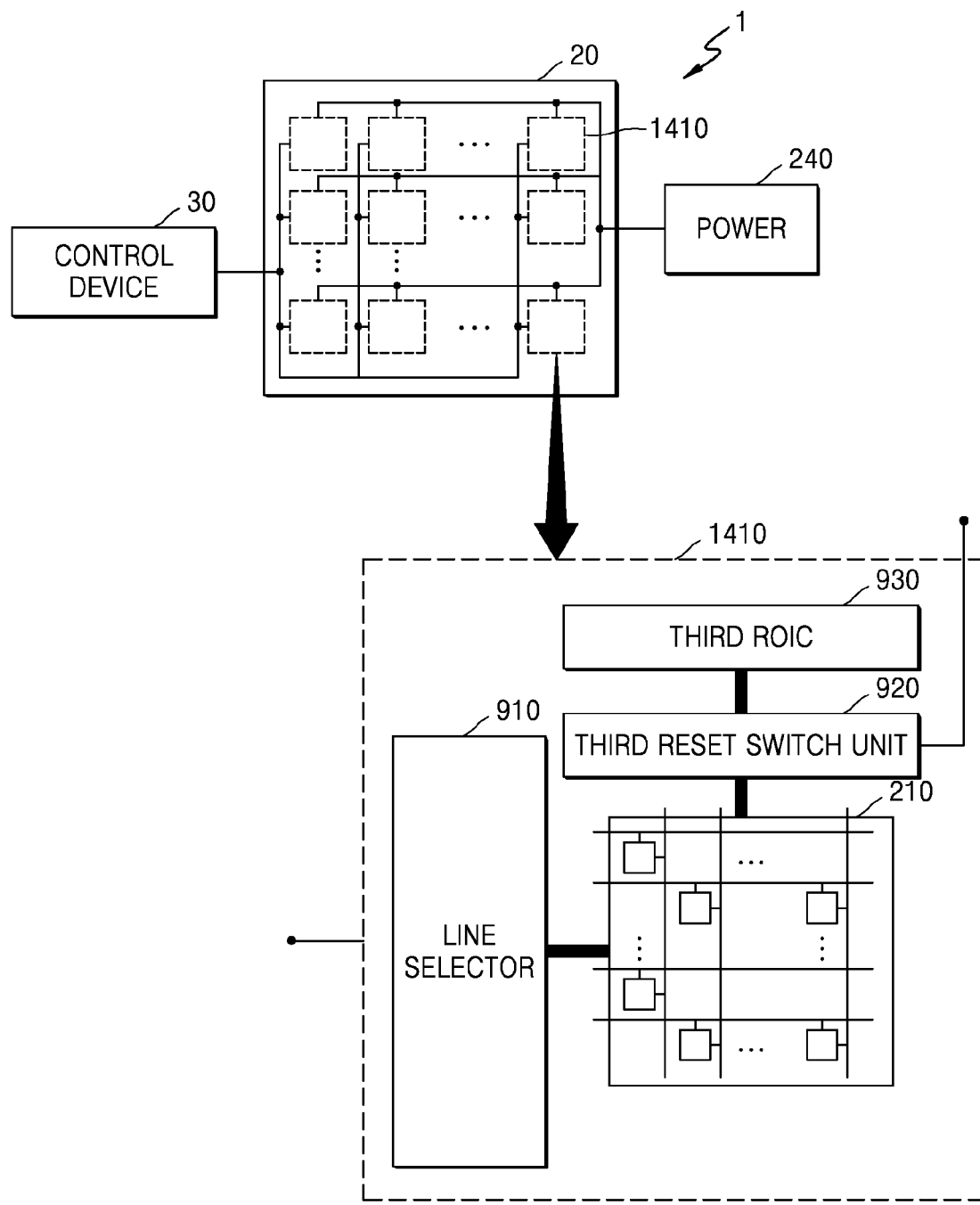
FIG. 14 is a block diagram illustrating an internal structure of the X-ray detecting apparatus of the X-ray imaging system, according to another example embodiment.

FIG. 14 is a block diagram for explaining an internal structure of the X-ray detecting apparatus 20 of the X-ray imaging system 1, according to another example embodiment.

The X-ray imaging system 1 of FIG. 14 may be different from that of FIG. 13 only in terms of the circuit structure of each circuit set 1410 in the X-ray detecting apparatus 20.

Each circuit set 1410 may have the circuit structure of FIG. 9A or 9B. An overall operation of the X-ray detecting apparatus 20 of FIG. 14, particularly, an operation of the circuit set 1410, may be the same as the operation described above with reference to FIG. 9A or 9B, and thus descriptions of the operation with reference to FIG. 9A or 9B may also apply to FIG. 14.

Although the X-ray detecting apparatus 20 of FIG. 13 or 14 may include the circuit sets 1310 each having the circuit structure of FIG. 8A or 8B or the circuit sets 1410 each having the circuit structure of FIG. 9A or 9B, example embodiments are not limited thereto. According to another example embodiment, the X-ray detecting apparatus 20 of FIG. 13 or 14 may include a circuit set 1310 or 1410 having any of the circuit structures described above with reference to FIGS. 10A-11B.

Figure 15:
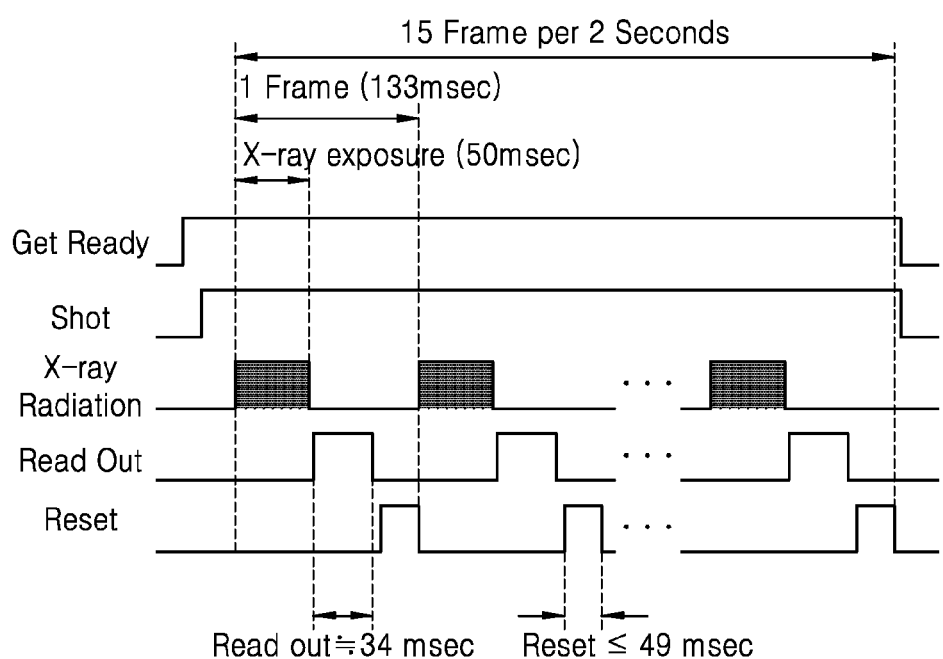
FIG. 15 is a timing diagram illustrating an X-ray radiating operation to a reset operation that is repeatedly performed in the X-ray imaging system, according to an example embodiment.

FIG. 15 is a timing diagram for explaining from an X-ray radiating operation to a reset operation that are repeatedly performed in the X-ray imaging system 1, according to an example embodiment.

Referring to FIG. 15, it is assumed that the X-ray imaging system 1 has an operational speed of 15 frames per 2 seconds=7.5 frame/sec. It is also assumed that one cycle is a time interval between a time point when an X-ray starts being radiated and a time point when a next X-ray starts being radiated.

For example, 133 msec is taken after an X-ray is radiated by the X-ray radiating apparatus 10 in a k-th cycle and before an X-ray is radiated by the X-ray radiating apparatus 10 in a (k+1)th cycle (where k is a natural number equal to or greater than 1). In this case, for 133 msec, which is a time period of one cycle, an X-ray image of one frame may be acquired.

For example, when describing an operation of the X-ray imaging system 1 during a first cycle, the X-ray radiating apparatus 10 may radiate an X-ray toward the part of the patient 2 that is to be examined for 50 msec. After the X-ray is radiated, an X-ray that has passed through the part to be examined is read out for about 34 msec by the X-ray detecting apparatus 20 in the read-out mode. At this time, during the read-out mode, the control device 30 may control a switching operation of the reset controller 230 so that the detector 210 may be connected to the read-out unit 220. After the read-out is completed, the pixels of the pixel array of the detector 210 may have a reset period of 49 msec. At this time, during the reset mode, the control device 30 may control a switching operation of the reset controller 230 so that the detector 210 may be connected to the reset power source 240.

A reset operation of the X-ray detecting apparatus 20 may be performed within a time period of 5 msec to 20 msec, which is greatly shorter than the given time period of 49 msec. This is because, in the reset mode of the X-ray detecting apparatus 20, all of the row lines may be simultaneously selected by the line selector 810, 910, 1010 or 1110 and thus all of the pixels of the detector 210 may be simultaneously activated (or turned on), and the reset power source 240 may be simultaneously supplied to all of the activated (or turned-on) pixels of the detector 210 by switching of the reset controller 230 and thus all of the pixels of the detector 210 may be simultaneously reset. As a result, as described above, resetting may be performed within a short period of time, and an offset between the pixels of the pixel array of the detector 210 may be reduced. If resetting is completed within 5 msec during the given time period of 49 msec, the X-ray detecting apparatus 20 may have enough time to reset other circuit devices such as the photoconductor layer 710 of FIG. 7 during the remaining time of 44 msec or more.

Additionally, the time ranges given in these example embodiments are merely illustrative and the time ranges other than the ones discussed may be used with the example embodiments.

Figure 16:
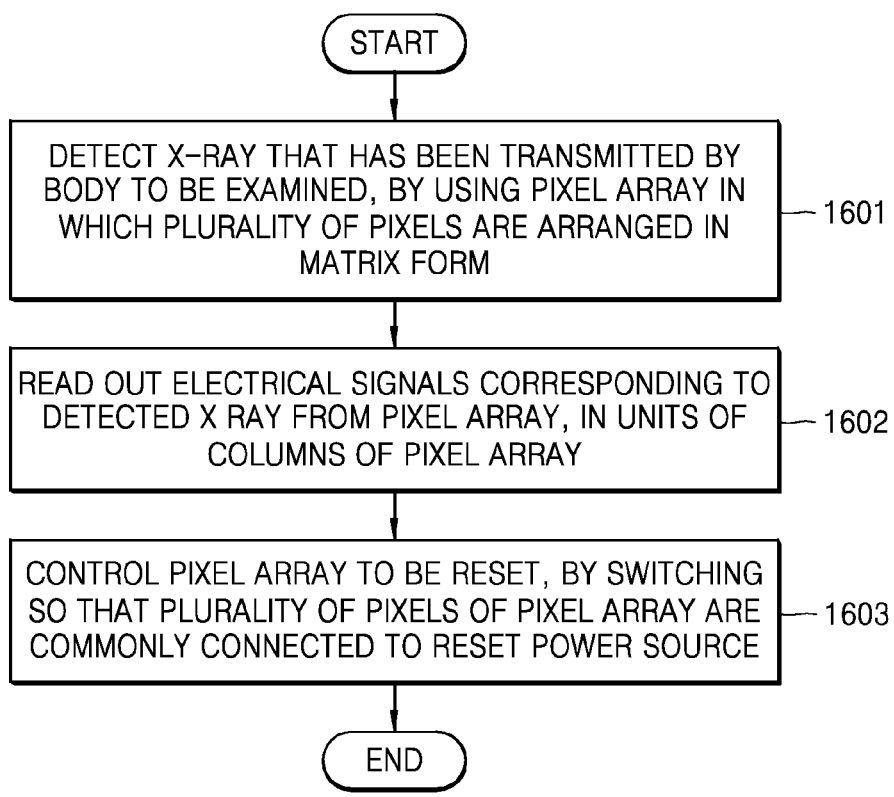
FIG. 16 is a flowchart of an X-ray detecting method according to an example embodiment.

FIG. 16 is a flowchart of an X-ray detecting method according to an example embodiment. The X-ray detecting method of FIG. 16 may be a time sequential process performed by the X-ray imaging system 1, particularly, the X-ray detecting apparatus 20, described above with reference to FIGS. 1-15. Accordingly, although omitted, previous descriptions with reference to FIGS. 1-15 may also apply to the X-ray detecting method of FIG. 16.

In operation 1601, the detector 210 may detect an X-ray that may have been transmitted by a body to be examined (i.e., the patient 2), by using a pixel array in which a plurality of pixels may be arranged in a matrix form.

In operation 1602, the read-out unit 220 may read out electrical signals corresponding to the detected X ray from the pixel array.

In operation 1603, the reset controller 230 may control the pixel array to be reset, by performing switching so that reset power of the reset power source 240 that may be commonly connected to the plurality of pixels of the pixel array may be supplied.

Figure 17:
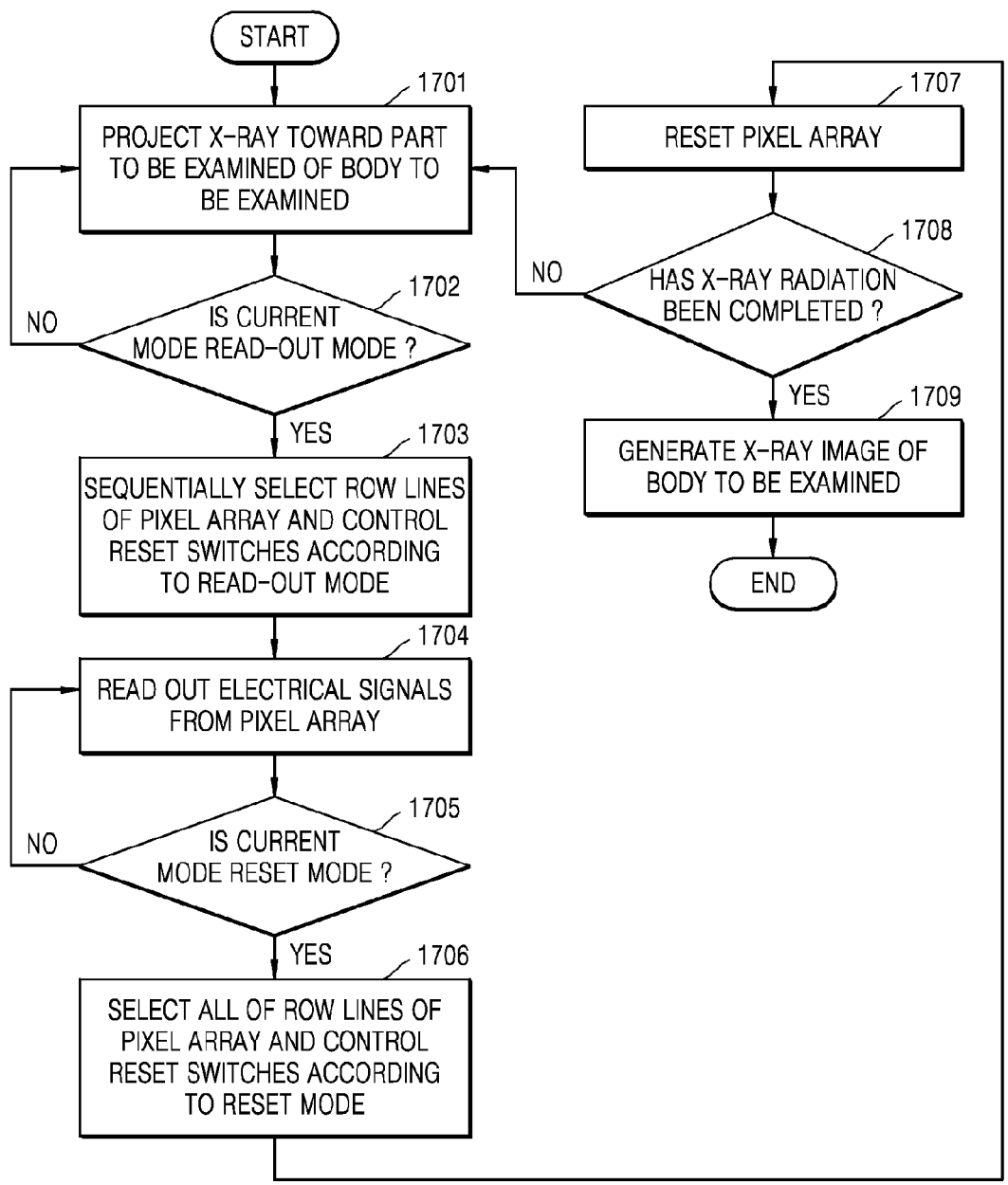
FIG. 17 is a flowchart of an X-ray imaging method according to an example embodiment.

FIG. 17 is a flowchart of an X-ray imaging method according to an example embodiment. The X-ray imaging method of FIG. 17 may be a time sequential process performed by the X-ray imaging system 1 described above with reference to FIGS. 1-15. Accordingly, although omitted, previous descriptions with reference to FIGS. 1-16 may also apply to the X-ray detecting method of FIG. 17.

In operation 1701, the X-ray radiating apparatus 10 may project an X-ray toward a to-be-examined part of the body to be examined (i.e., the patient 2).

In operation 1702, the control device 30 may determine whether a current mode is a read-out mode. If it is determined that the current mode is not a read-out mode, the method may return to operation 1701. On the other hand, if it is determined that the current mode is a read-out mode, the method may proceed to operation 1703.

In operation 1703, the control device 30 may generate a row address signal for sequentially selecting the row lines of the pixel array of the detector 210, and the line selector 810, 910, 1010 or 1110 may generate a gate driving signal based on the row address signal to sequentially select the row lines of the pixel array. In the read-out mode, the reset controller 230 may control the reset switches so that the detector 210 may be connected to the read-out unit 220.

In operation 1704, the read-out unit 220 may read out electrical signals corresponding to an X ray detected from the pixels of the pixel array of the detector 210.

In operation 1705, the control device 30 may determine whether a current mode is a reset mode. If it is determined that the current mode is not a reset mode, the method may return to operation 1704. On the other hand, if it is determined that the current mode is a reset mode, the method may proceed to operation 1706.

In operation 1706, the control device 30 may generate a row address signal for selecting all of the row lines of the pixel array of the detector 210, and the line selector 810, 910, 1010 or 1110 may generate a gate driving signal based on the row address signal to select all of the row lines of the pixel array. In the reset mode, the reset controller 230 may control the reset switches so that the detector 210 may be connected to the reset power source 240.

In operation 1707, the plurality of pixels of the pixel array of the detector 210 may be simultaneously reset by the power supplied from the reset power source 240 that may be commonly connected to the plurality of pixels of the pixel array.

In operation 1708, the control device 30 may determine whether X-ray radiation directed toward the part of the body to be examined (i.e., the patient 2) has been completed. If it is determined that the X-ray radiation has not yet been completed, the method may return to operation 1701. In this case, in operation 1701, an X-ray may be radiated to the part to be examined at a different angle than the angle at which the previous X-ray radiation may have been performed, or an X-ray may be radiated to another to-be-examined part. On the other hand, if it is determined that the X-ray radiation has been completed, the method may proceed to operation 1709.

In operation 1709, the control device 30 may generate an X-ray image of the body to be examined by using electrical signals read out by the read-out unit 220.

The term "reset" used herein may be replaced with any term that has a similar meaning, such as the term "refresh".

Although a medical apparatus using X-ray radiation, such as computed tomography (CT), Tomosynthesis, Breast Tomosysthesis (BTS), is illustrated in the example embodiments to explain a reset method, the above-described reset method may also apply to medical apparatuses (e.g., positron emission tomography (PET)) using other types of radiation.

As described above, according to the one or more of the above example embodiments, a plurality of pixels of a pixel array within a X-ray detecting apparatus may be quickly reset, and an offset phenomenon in which a difference is generated between the reset voltages of pixels connected to different lines after the pixel array is reset may be prevented or reduced.

The units, controllers and/or modules described herein may be implemented using hardware components, software components, or a combination thereof. For example, the hardware components may include microcontrollers, memory modules, sensors, microphones, amplifiers, band-pass filters, audio to digital converters, and processing devices, or the like. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of some example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments. While some example embodiments have been particularly shown and described, it will be understood by one of ordinary skill in the art that variations in form and detail may be made therein without departing from the spirit and scope of the claims.

What is claimed is:

1. An apparatus for detecting an X-ray, the apparatus comprising:
   a detector, including a pixel array, the pixel array including a plurality of pixels arranged in a matrix form, configured to detect X-ray radiation transmitted by a body to be examined;
   a read-out unit configured to read out electrical signals corresponding to the detected X-ray radiation from the pixel array; and
   a reset controller configured to:
   perform switching so that the plurality of pixels of the pixel array are commonly connected to a reset power source thereby resetting the pixel array after the X-ray radiation is detected, and so that the plurality of pixels of the pixel array are connected to the read-out unit when the apparatus is in a read-out mode for reading out the electrical signals.

2. The apparatus of claim 1, wherein the reset controller is configured to perform the switching so that the plurality of pixels of the pixel array are commonly connected to the reset power source, by setting at least one switch connected between the detector and the read-out unit.

3. The apparatus of claim 2, wherein
   the reset controller includes the at least one switch connected to each of m column lines of the pixel array, wherein m is a natural number, and
   the at least one switch is commonly connected to the reset power source.

4. The apparatus of claim 3, wherein
   the read-out unit includes a first read-out unit connected to a first end of the detector and a second read-out unit connected to a second end of the detector, and
   the reset controller includes m pairs of switches, each pair of switches connected to ends of each m column lines.

5. The apparatus of claim 3, wherein
   the read-out unit is connected to one end of the detector, and
   the reset controller includes m switches each of which is connected to one end of each of the m column lines.

6. The apparatus of claim 1, wherein
   each of the plurality of pixels includes a storage capacitor configured to store a charge amount which varies according to the intensity of the detected X ray, and
   the reset power source is configured to reset the charge amount of the storage capacitor using power supplied from the reset power source commonly connected to the plurality of pixels.

7. The apparatus of claim 1, wherein
   the read-out unit is configured to read out the electrical signals in units of row lines of the pixel array,
   the apparatus includes a line selector configured to select the row lines of the pixel array according to a row address signal configured to drive the pixel array in units of row lines, and
   the line selector configured to select all of the row lines of the pixel array when in a reset mode for resetting the pixel array.

8. The apparatus of claim 1, wherein the reset controller is configured to control the switching so that the plurality of pixels of the pixel array are commonly connected to the reset power source, when in a reset mode for resetting the pixel array.

9. The apparatus of claim 1, wherein the reset power source is configured to select at least one from a Low Drop Out (LDO) regulator, a direct current (DC)-to-DC converter, and an alternating current (AC)-to-DC converter that are included outside the detector, the read-out unit, and the reset controller.

10. The apparatus of claim 1, wherein the reset controller is configured to perform switching so that the plurality of pixels of the pixel array are commonly connected to the reset power source, by using at least one switch connected to the pixel array.

11. A method of resetting an X-ray detecting apparatus, the method comprising:
    detecting X-ray radiation transmitted by a body to be examined, by using a pixel array in which a plurality of pixels are arranged in a matrix form;
    reading out electrical signals corresponding to the detected X-ray radiation from the pixel array using a read-out unit; and
    performing switching so that the plurality of pixels of the pixel array are commonly connected to a reset power source, thereby resetting the pixel array, and so that the plurality of pixels of the pixel array are connected to the read-out unit when the X-ray detecting apparatus is in a read-out mode for reading out the electrical signals.

12. The method of claim 11, wherein the controlling includes performing the switching so that the plurality of pixels of the pixel array are commonly connected to the reset power source, by using at least one switch connected between a detector and a read-out unit.

13. The method of claim 12, wherein the controlling includes controlling the pixel array to be reset, by performing switching so that the at least one switch connected to each of m column lines of the pixel array is connected to the reset power source, wherein m is a natural number.

14. The method of claim 11, wherein
the reading out includes reading out the electrical signals in units of row lines of the pixel array, and
the method includes selecting the row lines of the pixel array according to a row address signal for driving the pixel array in units of row lines, and
the selecting includes selecting all of the row lines of the pixel array in a reset mode for resetting the pixel array.

15. The method of claim 11, wherein the controlling includes controlling the switching so that the plurality of pixels of the pixel array are commonly connected to the reset power source, in a reset mode for resetting the pixel array.

16. The method of claim 11, wherein the controlling includes controlling the pixel array to be reset, by performing switching so that reset power of the reset power source is supplied by using at least one switch that is in a detector and connected to the pixel array.

17. The method of claim 11, wherein the resetting of the pixel array is completed within 49 msec.

18. The method of claim 17, wherein the resetting of the pixel array is completed within 20 msec.

19. A detecting apparatus comprising:
a pixel array including a plurality of pixels, the pixel array configured to detect radiation that has been transmitted by a body to be examined;
a read-out unit configured to read out electrical signals corresponding to the detected radiation from the pixel array;
a plurality of data lines connected to the plurality of pixels; and
a plurality of switches connected to the plurality of data lines and connected to the read-out unit in a read-out mode, and
the plurality of switches connected to the plurality of data lines and to a reset power source in a reset mode; and
a reset controller configured to reset the pixel array, the controlling including setting the plurality of switches so that the plurality of pixels of the pixel array are commonly connected to the reset power source when in the reset mode.

20. The detecting apparatus of claim 19, wherein the plurality of switches are connected between the pixel array and the read-out unit.

21. The detecting apparatus of claim 19, wherein
each of the plurality of pixels includes a storage capacitor configured to store a charge amount which varies according to the intensity of the detected radiation, and
the storage capacitor configured to reset the charge amount when supplied by power from the reset power source, the reset power source commonly connected to the plurality of pixels.

22. The detecting apparatus of claim 19, wherein
the read-out unit is configured to read out the electrical signals in units of row lines of the pixel array,
the detecting apparatus includes a line selector which selects the row lines of the pixel array according to a row address signal for driving the pixel array in units of row lines, and
in the reset mode, the line selector selects all of the row lines of the pixel array.

23. The detecting apparatus of claim 19, wherein the reset power source is configured to select at least one from an LDO regulator, a DC-to-DC converter, and an AC-to-DC converter, that are included outside the pixel array and the read-out unit.

24. The detecting apparatus of claim 19, wherein the radiation includes an X-ray.

* * * * *